US012025383B2

(12) United States Patent
Bush

(10) Patent No.: US 12,025,383 B2
(45) Date of Patent: Jul. 2, 2024

(54) AIR-TO-AIR HEAT RECOVERY CORE AND METHOD OF OPERATING THE SAME

(71) Applicant: Mitsubishi Electric US, Inc., Cypress, CA (US)

(72) Inventor: Joseph Paul Bush, Lawrenceville, GA (US)

(73) Assignee: Mitsubishi Electric US, Inc., Cypress, CA (US)

( * ) Notice: Subject to any disclaimer, the term of this patent is extended or adjusted under 35 U.S.C. 154(b) by 482 days.

(21) Appl. No.: 17/217,421

(22) Filed: Mar. 30, 2021

(65) Prior Publication Data
US 2022/0316807 A1  Oct. 6, 2022

(51) Int. Cl.
F28D 9/00 (2006.01)
F24F 12/00 (2006.01)
F28D 21/00 (2006.01)

(52) U.S. Cl.
CPC .......... *F28D 9/0025* (2013.01); *F24F 12/001* (2013.01); *F24F 12/006* (2013.01); *F28D 21/0003* (2013.01)

(58) Field of Classification Search
CPC ....... F24F 12/001; F24F 12/006; F28D 9/025; F28D 21/0001; F28D 21/0003; F28D 21/0005; F28D 21/0008; F28D 21/0014
See application file for complete search history.

(56) References Cited

U.S. PATENT DOCUMENTS 326,839 A * 9/1885 Braithwaite, Jr. et al. ..................
F28D 9/0025
165/DIG. 399
2,019,351 A * 10/1935 Lathrop ................ F24F 12/001
62/412

(Continued)

FOREIGN PATENT DOCUMENTS

CN 204268934 U 4/2015
JP 2012-112579 A 6/2012
WO 2011/153595 A1 12/2011

OTHER PUBLICATIONS

Greiciunas et al. "A numerical evaluation of next generation additive layer manufactured inter-layer channel heat exchanger." Applied Thermal Engineering, vol. 162,5, pp. 1-15, Aug. 26, 2019.

*Primary Examiner* — Eric S Ruppert
*Assistant Examiner* — Hans R Weiland
(74) *Attorney, Agent, or Firm* — Posz Law Group, PLC

(57) ABSTRACT

An air-to-air heat recovery core, comprising: a core assembly having parallel first and second channels that are open to first and second sides of the core assembly, respectively, the first and second channels interleaved, and each first channel sharing a wall with an adjacent second channel; first and second sealants formed along opposite first and second edges, respectively, of the core assembly perpendicular to a running direction of the first and second channels, the first and second sealants respectively blocking first and second ends of the channels; and first and second panels secured to (Continued)

first and second sides of the core assembly, respectively, the first and second panels blocking a middle portion of the first and second channels, respectively, such that air can enter and leave the first and second channels via the first and second end portions of the first and second channels but not via the middle portions.

21 Claims, 11 Drawing Sheets

(56) References Cited

U.S. PATENT DOCUMENTS

| | | | | |
|---|---|---|---|---|
| 2,281,754 | A * | 5/1942 | Dalzell | F28F 3/083 165/76 |
| 3,719,227 | A * | 3/1973 | Jenssen | F28D 9/0025 165/DIG. 399 |
| 4,043,388 | A * | 8/1977 | Zebuhr | F28D 9/0025 165/DIG. 399 |
| 4,384,611 | A * | 5/1983 | Fung | F28D 9/0025 165/DIG. 399 |
| 4,407,357 | A * | 10/1983 | Hultgren | F28D 9/0006 165/DIG. 399 |
| 4,449,573 | A * | 5/1984 | Pettersson | F28D 19/042 165/DIG. 42 |
| 4,569,391 | A * | 2/1986 | Hulswitt | F28F 3/044 165/DIG. 387 |
| 5,469,914 | A * | 11/1995 | Davison | F28F 3/005 165/165 |
| 5,899,261 | A * | 5/1999 | Brzytwa | F28D 19/044 165/8 |
| 6,059,023 | A * | 5/2000 | Kurematsu | F28D 9/0025 165/DIG. 399 |
| 6,408,941 | B1 * | 6/2002 | Zuo | F28D 9/0025 165/DIG. 399 |
| 7,150,099 | B2 * | 12/2006 | Whittenberger | F28F 3/027 165/DIG. 399 |
| 2003/0075311 | A1 * | 4/2003 | Seaba | F28D 9/0025 257/E23.098 |
| 2003/0159802 | A1 * | 8/2003 | Steneby | F24F 12/006 165/59 |
| 2005/0199380 | A1 * | 9/2005 | Thyrum | F28F 3/025 165/165 |
| 2009/0056926 | A1 * | 3/2009 | Chen | F28D 9/0025 165/167 |
| 2012/0132405 | A1 * | 5/2012 | Takubo | F28D 21/0014 165/157 |
| 2013/0160970 | A1 * | 6/2013 | Takubo | F28D 9/0025 165/59 |
| 2014/0014289 | A1 | 1/2014 | Tan | |
| 2017/0051985 | A1 | 2/2017 | Steinbauer et al. | |
| 2018/0038658 | A1 * | 2/2018 | Eplee | F28D 21/0015 |
| 2018/0051896 | A1 * | 2/2018 | Swindon | F28D 9/0025 |
| 2018/0363929 | A1 | 12/2018 | Mullen et al. | |
| 2019/0285289 | A1 | 9/2019 | Dean et al. | |

\* cited by examiner

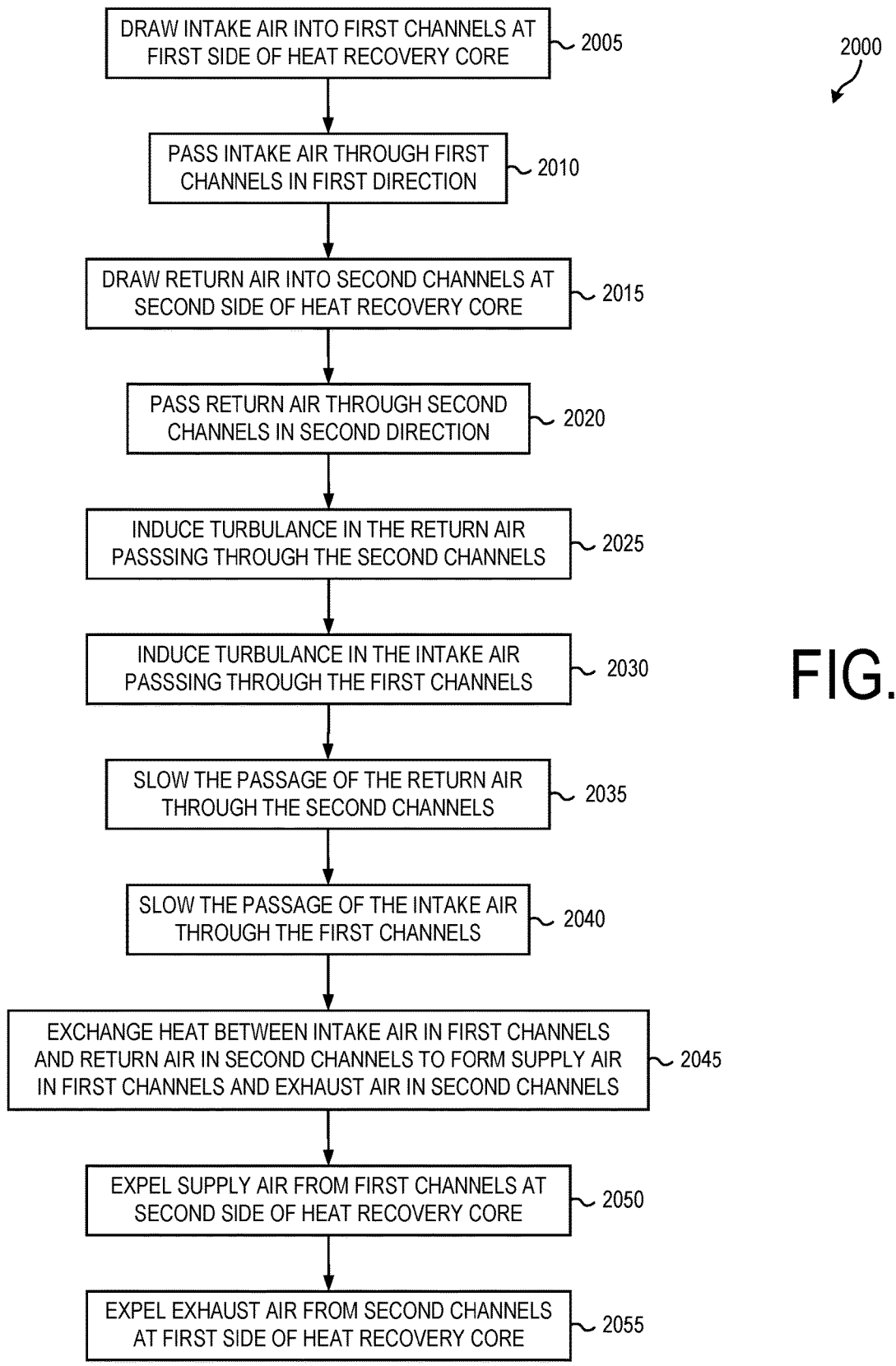

AIR-TO-AIR HEAT RECOVERY CORE AND METHOD OF OPERATING THE SAME

TECHNICAL FIELD

The disclosed devices and methods relate generally to an air-to-air heat recovery core. More particularly, the disclosed devices and methods relate to an air-to-air heat recovery core that includes multiple parallel channels separated by thin heat-conductive walls in which every other channel receives return air and expels exhaust air and every other channel receives intake air and expels supply air.

BACKGROUND

A heating, ventilation, and air conditioning (HVAC) system will often operate to exchange internal air in a structure whose temperature is being controlled with external air outside the structure. This allows the structure to receive a constant influx of fresh air rather than recirculating the same air over and over. Circulating new outside air into a structure can reduce the presence of moisture, pollutants, and contaminants in the air within the structure.

However, given that the air inside the structure is typically at a desired temperature while the air outside the structure is typically at an undesired temperature (hotter when the outside temperature is high; colder when the outside temperature is low), many HVAC systems will provide a heat recovery ventilator (HRV) that transfers heat between the inside air and the outside air as the two are exchanged.

When the HVAC system is in a cooling mode, the HRV will use the cooler inside air to cool down the new outside air as it is being drawn in into the structure. Likewise, when the HVAC system is in a heating mode, the HRV will use the warmer inside air to heat up the new outside air as it is being drawn in into the structure. This will bring the temperature of the new outside air to a point closer to the desired inside temperature so that the HVAC system can expend less energy to bring the new outside air to a desired inside temperature.

Air from the outside that is drawn in by the HVAC system for supply to the interior of the structure is typically referred to as intake air, while air being drawn in by the HVAC system for expulsion to the outside environment is typically referred to as return air. After the intake air exchanges heat with the return air, the now hotter or colder intake air is provided to the HVAC system as supply air and the now hotter or colder return air is expelled to the outside environment as exhaust air.

An energy recovery ventilator (ERV) is similar to an ERV except that in addition to controlling the temperature of the supply air to bring it closer to a desired interior temperature, it also controls the humidity of the supply air to bring it closer to a desired interior humidity. This allows the HVAC system to more easily maintain a high interior humidity during cold weather and a low internal humidity during hot weather.

Both an HRV and an ERV will include a heat recovery core that operates to transfer the heat between these two air paths: a return-to-exhaust air path and an intake-to-supply air path. This heat recovery core allows the heat to pass from one air path to the other. The efficiency of the heat recovery core will directly influence how much power is saved in the associated HVAC system.

It would therefore be desirable to provide a heat recovery core that maximizes the efficiency of heat transfer between a return-to-exhaust air path and an intake-to-supply air path.

SUMMARY OF THE INVENTION

According to one or more embodiments, an air-to-air heat recovery core is provided, comprising: a core assembly having a plurality of first channels and a plurality of second channels defined by a plurality of parallel walls, in which the plurality of first channels and the plurality of second channels are all parallel, the plurality of first channels are open to a first side of the core assembly, the plurality of second channels are open to a second side of the core assembly opposite the first side of the core assembly, the plurality of first channels are interleaved with the plurality of second channels such that each of the plurality of first channels is adjacent to at least one of the plurality of second channels, each of the plurality of second channels is adjacent to at least one of the plurality of first channels, none of the plurality of first channels is adjacent to another one of the plurality of first channels, and none of the plurality of second channels is adjacent to another one of the plurality of second channels, and each of the plurality of first channels shares a wall with an adjacent one of the plurality of second channels; a first sealant formed along a first edge of the core assembly perpendicular to a running direction of the plurality of first channels and the plurality of second channels, the first sealant configured to block first ends of the plurality of first and second channels; a second sealant formed along a second edge of the core assembly perpendicular to the running direction of the plurality of first channels and the plurality of second channels and opposite the first edge of the core assembly, the second sealant configured to block second ends of the plurality of first and second channels; a first panel secured to the first side of the core assembly, the first panel configured to block a middle portion of each of the plurality of first channels, the middle portion of each of the plurality of first channels being located between first and second end portions of each of the plurality of first channels, such that air can enter and leave each of the plurality of first channels via the first and second end portions of the plurality of first channels but cannot enter and leave each of the plurality of first channels via the middle portions of each of the plurality of first channels; and a second panel secured to the second side of the core assembly, the second panel configured to block a middle portion of each of the plurality of second channels, the middle portion of each of the plurality of second channels being located between first and second end portions of each of the plurality of second channels, such that air can enter and leave each of the plurality of second channels via the first and second end portions of the plurality of second channels but cannot enter and leave each of the plurality of second channels via the middle portions of each of the plurality of second channels.

The plurality of first channels and the plurality of second channels may all have substantially the same width.

The air-to-air heat recovery core may further comprise: a first frame wall attached to a third edge of the core assembly perpendicular to the first and second edges of the core assembly; and a second frame wall attached to a fourth edge of the core assembly perpendicular to the first and second edges of the core assembly and opposite the third edge of the core assembly.

At least one wall in each of the first and second channels may have an impression formed in it, the impression extending away from the at least one wall in one direction.

A distance that the impression extends from the at least one wall may be approximately equal to a width of a selected one of the first and second channels that the impression extends into.

A first set of walls in the first and second channels may have a pattern of first impressions extending away from the first set of walls in an extending direction. A second set of walls in the first and second channels may have a pattern of second impressions extending away from the second set of walls in the extending direction. The first set of walls may be arranged in an alternating pattern with the second set of walls, and the pattern of first impressions may be different from the second pattern of impressions.

The pattern of first impressions may be one or more first zig-zagged trenches formed in a first arrangement, and the pattern of second impressions may be one or more second zig-zagging trenches formed in a second arrangement different from the first arrangement.

The pattern of first impressions may be a plurality of first individual impressions in the first set of walls, the pattern of second impressions may be a plurality of second individual impressions in the second set of walls, and none of the plurality of first impressions may be formed to be opposite one of the plurality of second impressions within any of the plurality of first and second channels.

An energy recovery ventilator is also provided that includes the air-to air heat recovery core, a first blower formed adjacent to the first end portions of the plurality of first channels and configured to blow exhaust air through the plurality of first channels in a first direction; and a second blower formed adjacent to the second end portions of the plurality of second channels and configured to blow supply air through the plurality of second channels in a second direction opposite the first direction.

The energy recovery ventilator may further comprise: a first filter formed adjacent to the second end portions of the plurality of first channels and configured to filter the exhaust air that passed through the plurality of first channels, and a second filter formed adjacent to the first end portions of the plurality of second channels and configured to filter the supply air that passed through the plurality of second channels.

A method of forming an air-to-air heat recovery core is also provided, comprising: repeatedly bending a flat plate in a corrugated manner to form a bent plate having a plurality of first channels open to a first side of the bent plate and a plurality of second channels parallel to the plurality of first channels and open to a second side of the bent plate opposite the first side of the bent plate; attaching a first sealant along a first edge of the bent plate perpendicular to a running direction of the plurality of first channels and the plurality of second channels in order to block first ends of the plurality of first and second channels; attaching a second sealant along a second edge of the bent plate perpendicular to a running direction of the plurality of first channels and the plurality of second channels and opposite the first edge of the bent plate in order to block second ends of the plurality of first and second channels; securing a first panel to the first side of the bent plate to block a middle portion of each of the plurality of first channels, the middle portion of each of the plurality of first channels being located between first and second end portions of each of the plurality of first channels, such that air can enter and leave each of the plurality of first channels via the first and second end portions of the plurality of first channels but cannot enter and leave each of the plurality of first channels via the middle portions of each of the plurality of first channels; and securing a second panel to the second side of the bent plate to block a middle portion of each of the plurality of second channels, the middle portion of each of the plurality of second channels being located between first and second end portions of each of the plurality of second channels, such that air can enter and leave each of the plurality of second channels via the first and second end portions of the plurality of second channels but cannot enter and leave each of the plurality of second channels via the middle portions of each of the plurality of second channels.

The flat plate may be made of metal, plastic, hydroponic resin, or cellulose fiber.

The plurality of first channels and the plurality of second channels may all have substantially the same width.

The method of forming the air-to-air heat recovery core may further comprise: attaching a first frame wall to a third edge of the bent plate perpendicular to the first and second edges of the bent plate; and a second frame wall attached to a fourth edge of the bent plate perpendicular to the first and second edges of the bent plate and opposite the third edge of the bent plate.

The method of forming the air-to-air heat recovery core may further comprise: forming a plurality of first impressions and a plurality of second impressions in the flat plate before repeatedly bending the flat plate, wherein the plurality of first impressions contains a plurality of first impression patterns each arranged in a first configuration that can be contained in a portion of the flat plate that will become a wall in one of the plurality of first and second channels, the plurality of second impressions contains a plurality of second impression patterns each arranged in a second configuration that can be contained in the portion of the flat plate that will become the wall in one of the plurality of first and second channels, the plurality of first and second impression patterns are arranged such that each of the plurality of first and second impression patterns is formed on a different portion of the flat plate that will become a wall in one of the plurality of first and second channels, and the plurality of first impression patterns are interleaved with the plurality of second impression patterns such that none of the plurality of first impression patterns is adjacent to another of the plurality of first impression patterns and none of the plurality of second impression patterns is adjacent to another of the plurality of second impression patterns.

Each of the first impression patterns may be different from each of the second impression patterns. Alternatively, each of the first impression patterns may be the same as each of the second impression patterns.

The first configuration may include a plurality of the first impressions formed as first zig-zagged trenches in a first arrangement, and the second configuration may include a plurality of the second impressions formed as first zig-zagged trenches in the first arrangement.

The first configuration may include a plurality of the first impressions formed as a plurality of first individual impressions in a first arrangement, the second configuration may include a plurality of the second impressions formed as a plurality of second individual impressions in a second arrangement different than the first arrangement, and none of the plurality of first impressions may formed to be opposite one of the plurality of second impressions within any of the plurality of first and second channels.

A method of circulating air through an air-to-air heat recovery core having a plurality of parallel, interleaved first and second channels is also provided, comprising: drawing intake air into the plurality of first channels at a first side of the air-to-air heat recovery core; passing the intake air through the plurality of first channels in a first direction; drawing return air into the plurality of second channels at a second side of the air-to-air heat recovery core opposite the first side of the air-to-air heat recovery core; passing the return air through the plurality of second channels in a second direction opposite the first direction; exchanging heat between the intake air passing through the plurality of first channels and the return air passing through the plurality of second channels to form supply air passing through the plurality of first channels and exhaust air passing through the plurality of second channels; expelling the supply air from the plurality of first channels at the second side of the air-to-air heat recovery core; and expelling the exhaust air from the plurality of second channels at the first side of the air-to-air heat recovery core, wherein each of the plurality of first channels is adjacent to at least one of the plurality of second channels and is not adjacent to any other of the plurality of first channels, and each of the plurality of second channels is adjacent to at least one of the plurality of first channels and is not adjacent to any other of the plurality of second channels.

Each of the plurality of first channels may be separated from an adjacent one of the plurality of second channels by a metal wall configured to pass heat.

The exhaust air may be warmer than the return air, and the intake air may be warmer than the supply air. Alternatively, the exhaust air may be cooler than the return air, and the intake air may be cooler than the supply air.

The method of circulating air through an air-to-air heat recovery core may further comprise: inducing turbulence into the intake air passing through the plurality of first channels, and inducing turbulence into the return air passing through the plurality of second channels.

The method of circulating air through an air-to-air heat recovery core may further comprise: slowing the passage of the intake air through the plurality of first channels by placing first obstacles to air passage in the first channels, and slowing the passage of the return air through the plurality of second channels by placing second obstacles to air passage in the second channels.

The method of circulating air through an air-to-air heat recovery core may further comprise: filtering the return air prior to drawing the return air into the plurality of first channels, and filtering the intake air prior to drawing the intake air into the plurality of second channels.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present disclosure.

FIG. 20 is a flow chart showing the operation of a heat recovery ventilator or energy recovery ventilator according to disclosed embodiments.

DETAILED DESCRIPTION

Introduction

In overview, the present disclosure concerns an air-to-air heat recovery core for use in a heat recovery ventilator (HRV) or an energy recovery ventilator (ERV) and a method of making and operating the same. A heat recovery core operates to pass two air flows, possibly in opposite directions, and exchange heat between these two air flows.

The disclosed heat recovery core is made of a thin piece of heat-conductive material, such as metal or plastic, that is bent into a frame that includes alternating first and second channels that each share a common wall. Thus, each channel, except for the two on either end, will share two walls with channels that pass a different air flow. This provides a large surface area on the shared walls for the two air flows to exchange heat through.

The shared walls will each have multiple impressions formed on them. These impressions serve multiple purposes. They will set and maintain a proper spacing of the channels by forcing a minimum channel width; they will increase the surface area of the walls, thus increasing heat transfer efficiency; they will induce air turbulence into the air flows, reducing laminar flow and increasing heat exchange; and they will increase the amount of distance or time the air has contact with the walls to increase heat transfer.

Various inventive concepts and principles are embodiments in systems, devices, and methods therein which provide an air-to-air heat recovery core that increases the heat exchange efficiency between two parallel air flows moving through the heat recovery core.

The instant disclosure is provided to further explain in an enabling fashion the best modes of performing one or more embodiments. The disclosure is further offered to enhance an understanding and appreciation for the inventive principles and advantages thereof, rather than to limit in any manner the embodiments.

It is further understood that the use of relational terms, such as first and second, if any, are used to distinguish one from another entity, item, or action without necessarily requiring or implying any actual such relationship or order between such entities, items or actions. Some embodiments may include a plurality of processes or steps, which can be performed in any order unless expressly and necessarily limited to a particular order (i.e., processes or steps that are not so limited may be performed in any order).

As further discussed below, various inventive principles and combinations thereof are advantageously employed to provide a heat recovery core that maximizes heat transfer between two parallel air flows through the heat recovery core.

Heat Recovery Core

Figure 1:
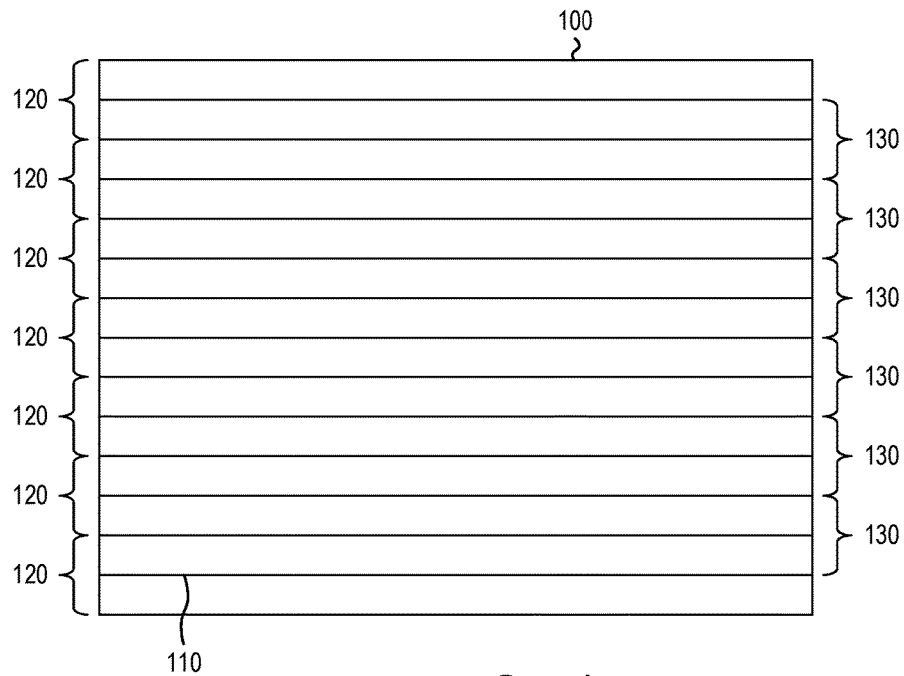
FIG. 1 is an overhead and side view of a heat-conductive sheet before and after it is folded to create a frame having triangular first and second channels according to disclosed embodiments.
Figure 1:
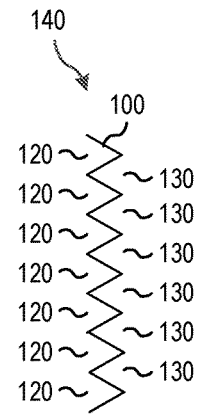

FIG. 1 is an overhead and side view of a heat-conductive sheet 100 before and after it is folded to create a frame 140 having triangular first and second channels 120, 130 according to disclosed embodiments. In alternate descriptions, the sheet 100 could be called a plate 100.

As shown in FIG. 1, a heat-conductive sheet 100 is provided that will be folded into a frame 140 by bending the sheet 100 along folds 110 to create alternating triangular first channels 120 and triangular second channels 130.

The sheet 100 can be made of any bendable or moldable, heat-conductive material. In some embodiments, the sheet 100 can be made of a metal, such as aluminum. In other embodiments, the sheet 100 can be formed of a heat-conductive plastic that could be bent in a press mold or similar device. Alternate embodiments can have the sheet 100 formed of a moisture-permeable material, such as a hydroponic resin or a cellulose fiber. Using a moisture-permeable material will allow for not only heat transfer (as used in an HRV) but also moisture transfer (as used in an ERV).

Each of the triangular first and second channels 120, 130 is bound by two walls and an open side. The walls of each first and second channel 120, 130 join at a fold 110, with the first and second channels 120, 130 alternating with each other. In this way each of the first channels 120 (except for any first channel 120 formed at the end of the frame 140) shares two walls with adjacent second channels 130. Likewise, each of the second channels 130 (except for any second channel 130 formed at the end of the frame 140) shares two walls with adjacent first channels 120. This creates large surfaces that facilitates heat transfer between air flowing through the first channels 120 and air flowing through the second channels 130.

As shown in FIG. 1, each of the first channels 120 is open to a first side of the frame 140. Likewise, each of the second channels 130 is open to a second side of the frame 140 opposite the first side.

Furthermore, although the embodiment of FIG. 1 shows a bendable sheet 100 that starts off flat and is bent along the folds 110 to create the frame 140, this is by way of example only. Alternate embodiments could use a molded material to create a frame 140 by another method. For example, in some embodiments the frame 140 could be created using a heat-conductive plastic formed in a mold.

Figure 2:
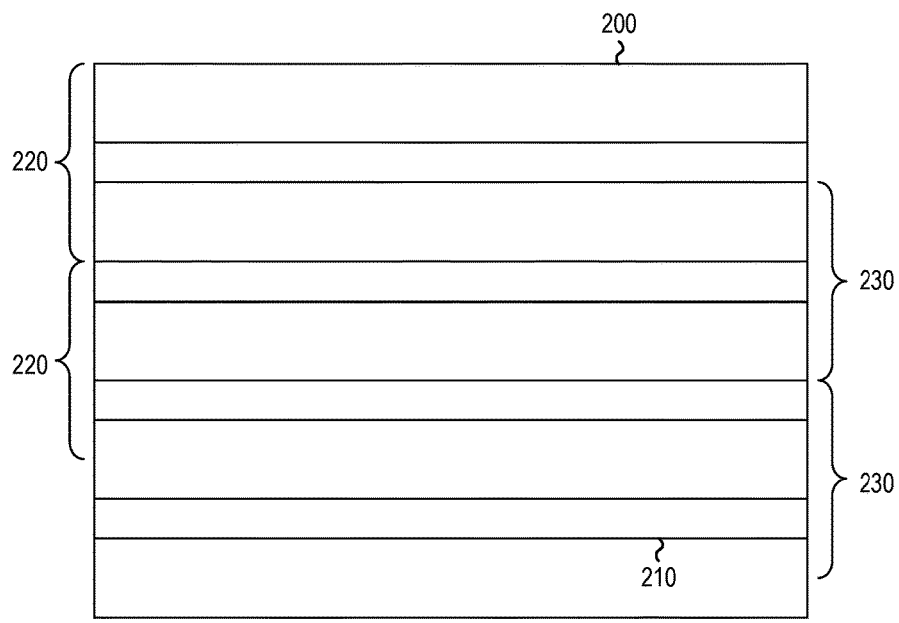
FIG. 2 is an overhead and side view of a heat-conductive sheet before and after it is folded to create a frame having rectangular first and second channels according to disclosed embodiments.
Figure 2:
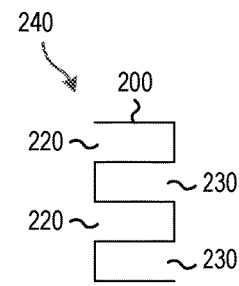

FIG. 2 is an overhead and side view of a heat-conductive sheet 200 before and after it is folded to create a frame 240 having rectangular first and second channels 220, 230 according to disclosed embodiments. In alternate descriptions, the sheet 200 could be called a plate 200.

As shown in FIG. 2, a heat-conductive sheet 200 is provided that will be folded into a frame 240 by bending the sheet 200 along folds 210 to create alternating rectangular first channels 220 and rectangular second channels 230.

The sheet 200 can be made of any bendable, heat-conductive material. In some embodiments, the sheet 200 can be made of a metal, such as aluminum. In other embodiments, the sheet 200 can be formed of a heat-conductive plastic that could be bent in a press mold or similar device. Alternate embodiments can have the sheet 200 formed from a moisture-permeable material, such as a hydroponic resin or a cellulose fiber. Using a moisture-permeable material will allow for not only heat transfer (as used in a HRV) but also moisture transfer (as used in an ERV).

Each of the rectangular first and second channels 220, 230 is bound by two side walls, an end wall, and an open side opposite the end wall. The side walls of each first and second channel 220, 230 join at a fold 210 with an end wall, with the first and second channels 220, 230 alternating. In this way each of the first channels 220 (except for any first channel 220 formed at the end of the frame 240) shares two side walls with adjacent second channels 230. Likewise, each of the second channels 230 (except for any second channel 230 formed at the end of the frame 240) shares two side walls with adjacent first channels 220. This creates large surfaces that facilitate heat transfer between air flowing through the first channels 220 and air flowing through the second channels 230.

As shown in FIG. 2, each of the first channels 220 is open to a first side of the frame 240. Likewise, each of the second channels 230 is open to a second side of the frame 240 opposite the first side.

Furthermore, although the embodiment of FIG. 2 shows a bendable sheet 200 that starts off flat and is bent along the folds 210 to create the frame 240, this is by way of example only. Alternate embodiments could use a molded material to create a frame 240 by another method. For example, in some embodiments the frame 240 could be created using a heat-conductive plastic formed in a mold.

FIGS. 1 and 2 show two examples of shapes that could be used for first channels 120, 220 and second channels 130, 230. However, this is by way of example only. A frame can be formed in a variety of manners and with a variety of shapes, provided that the first and second channels alternate and that each first channel shares a heat-transmissive wall with adjacent second channels and vice versa. For example, a frame could be formed having two straight side walls, a curved end, and an open end. Likewise, a frame could be formed having to straight side walls, a triangular pointed end, and an open end. Numerous other configurations are possible in alternate embodiments.

Figure 3:
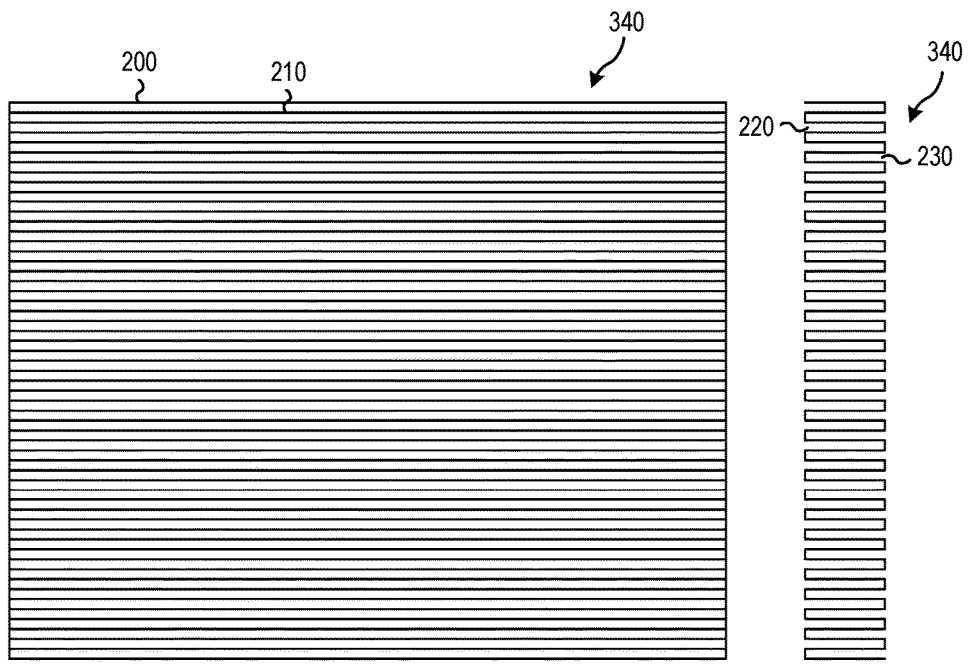
FIG. 3 is an overhead and side view of a frame having rectangular first and second channels according to disclosed embodiments.
Figure 4:
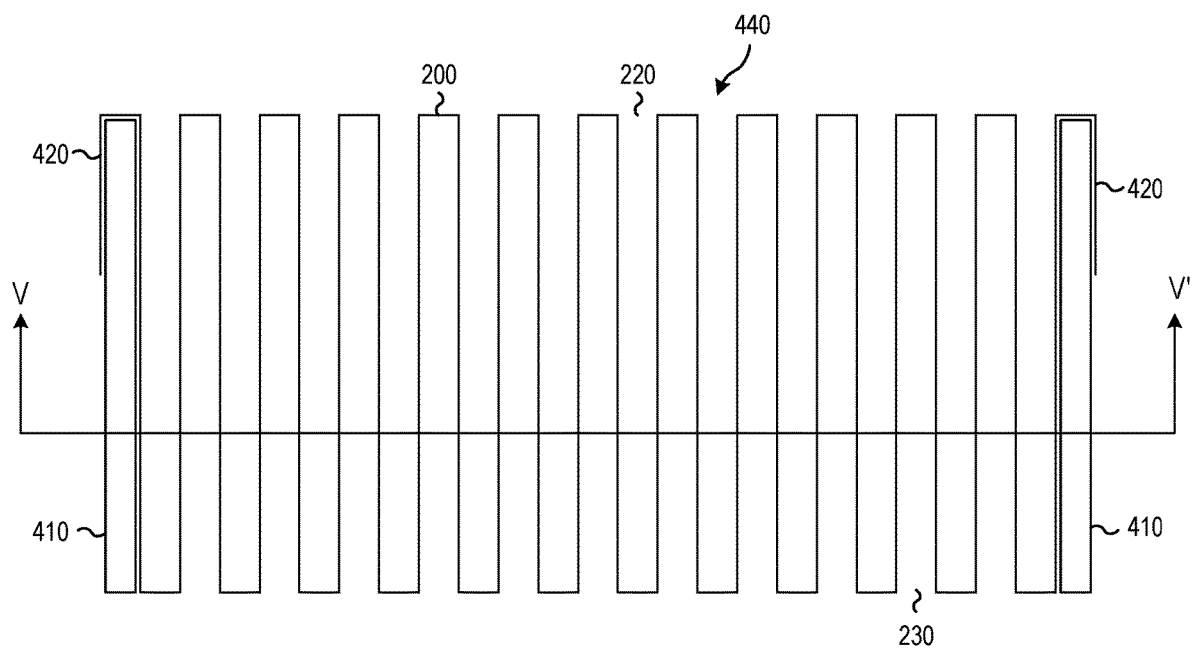
FIG. 4 is a side view of a frame having first and second channels including frame walls at first and second opposite ends according to disclosed embodiments.
Figure 5:
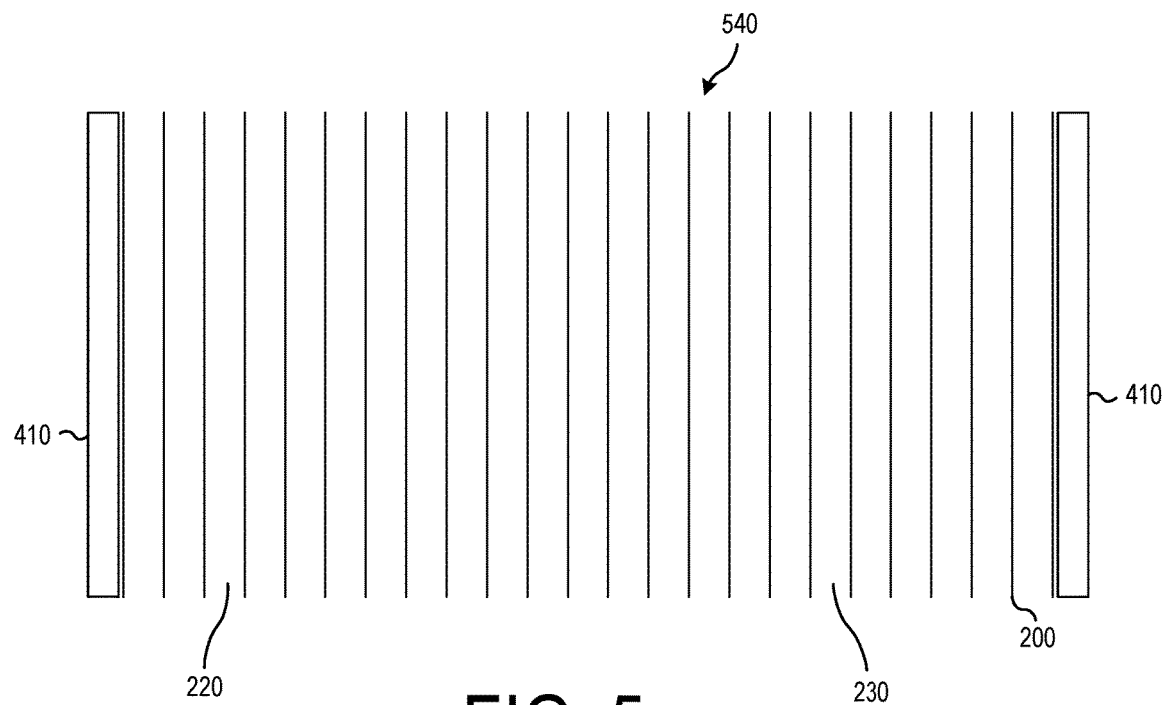
FIG. 5 is a cutaway view of the frame of FIG. 4 along a line V-V according to disclosed embodiments.
Figure 6:
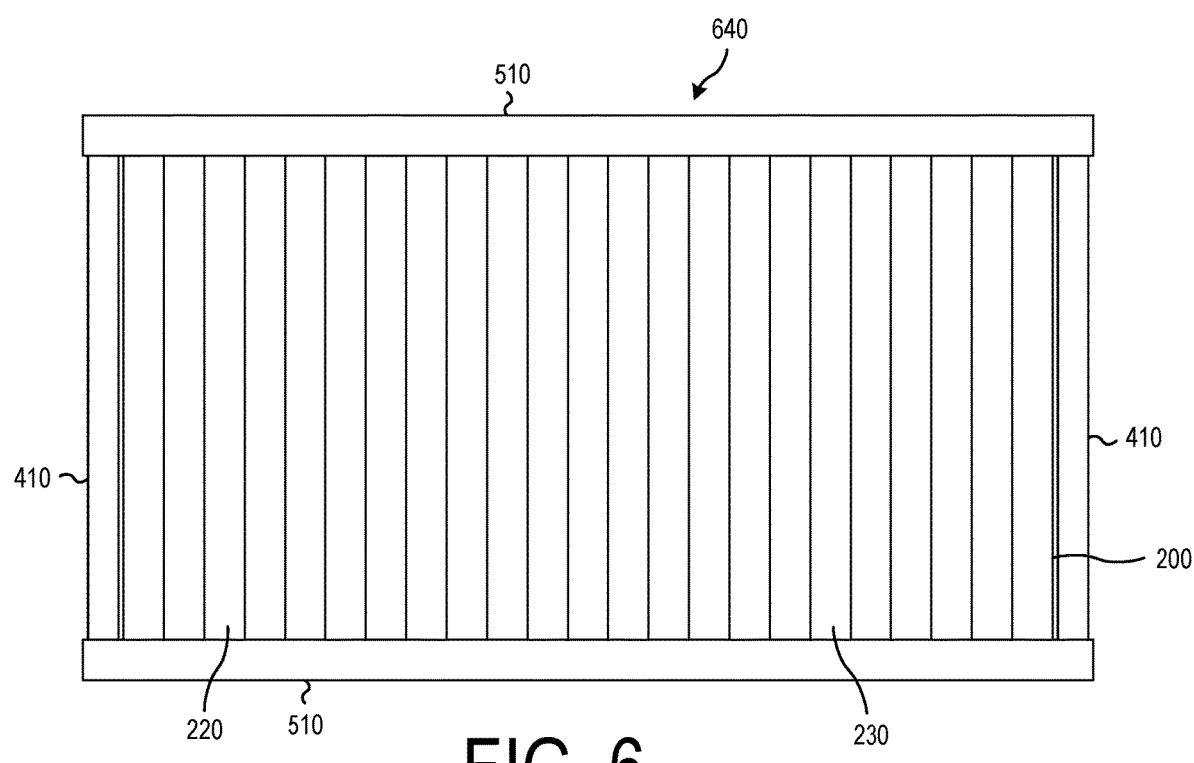
FIG. 6 is a top view of the frame of FIG. 5 including sealant at third and fourth opposite ends according to disclosed embodiments.
Figure 7:
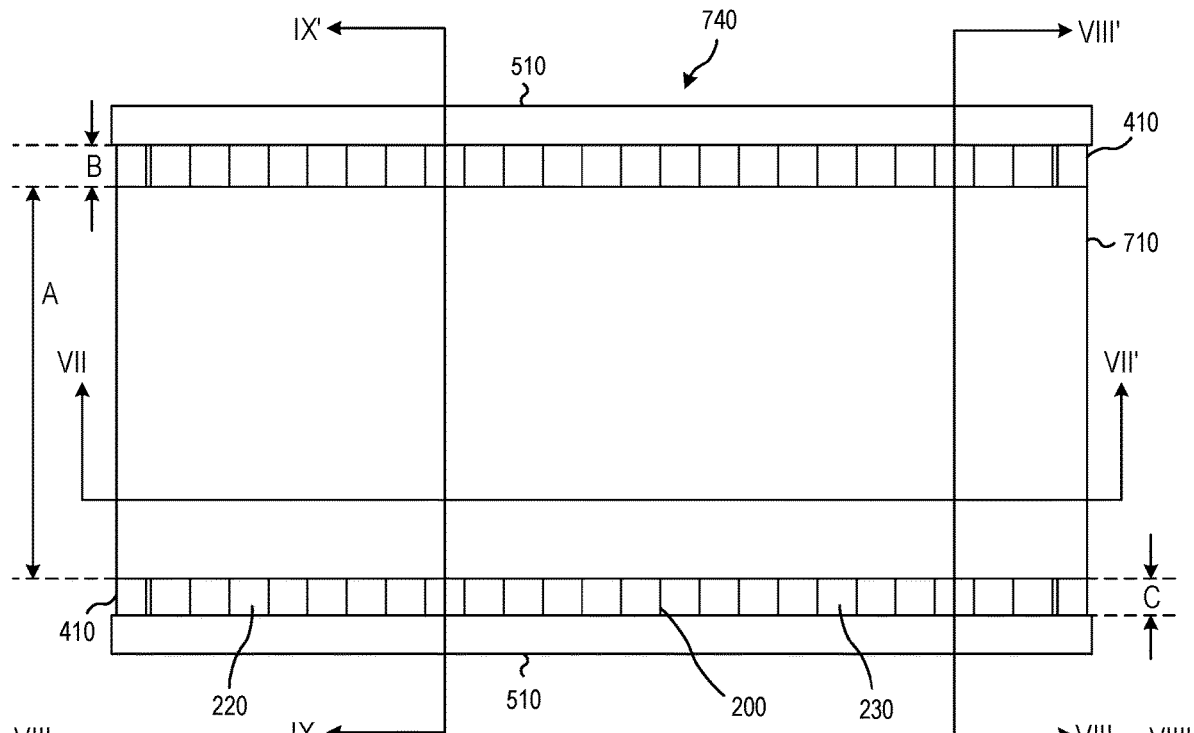
FIG. 7 is a top view of the frame of FIG. 6 including a first panel on a first side to form a heat recovery core according to disclosed embodiments.

FIGS. 3-7 show how a heat recovery core can be created. FIG. 3 shows how a frame can be formed to have a plurality of parallel first and second channels; FIGS. 4 and 5 show how first and second frame walls can be added; FIG. 6 shows how first and second sealants can be added; and FIG. 7 shows how first and second panels can be added.

FIG. 3 is an overhead and side view of a frame 340 having rectangular first and second channels 220, 230 according to disclosed embodiments.

As shown in FIG. 3, a frame 340 is formed of a heat-conductive sheet 200 that has been folded along folds 210 to create alternating rectangular first channels 220 and rectangular second channels 230.

FIG. 3 is similar in design to the frame 240 of FIG. 2 except that it shows a larger number of first and second channels 220, 230, and the dimensions of the first and second channels 220, 230 are such that the first and second channels 220, 230 are shown to have the sidewalls be significantly longer than the end walls. Having the sidewalls be longer than the end walls increases the common surfaces between the first and second channels 220, 230 through which heat may be transferred. First and second channels 220, 230 with long sidewalls and short end walls allow most of the surfaces bounding the airflow to be heat-transfer surfaces.

In some embodiments, the length of the sidewalls could be between four and ten times the length of the end walls. In some embodiments, the sidewalls will be in the range of 0.5 inches to 6 inches, and the end walls could be in the range of 0.0625 inches to 0.5 inches however, these ranges are by way of example only. The disclosed frame design could be applied to frames of any size and with varying dimensions.

FIG. 4 is a side view of a frame 440 having rectangular first and second channels 220, 230 including frame walls 410 at first and second opposite ends according to disclosed embodiments. The frame 440 is similar to the frames 240, 340 with the addition of the frame walls 410.

The frame walls 410 are formed of a material that is impermeable to air, such as metal or plastic, and are arranged on first and second edges of the frame 440 parallel to the sidewalls of the frame 440.

The last folds 210 in the frame 440 will cause the flat material that forms an end 420 of the frame 440 to lap over the sides of the frame walls 410 creating an airtight seal. This will provide the frame 440 with additional structure and will prevent air leakage from the first and second channels 220, 230 in the frame 440.

FIG. 5 is a cutaway view of the frame 440 of FIG. 4 along a line V-V according to disclosed embodiments.

As shown in FIG. 5, the frame 440 is bound on either end by a frame wall 410. Furthermore, first and second channels 220, 230 alternate with each other such that each first channel 220, except for a first channel 220 adjacent to a frame wall 410 shares a side wall with two adjacent second channels 230. The two first channels 220 that are adjacent to a frame wall 410 share a side wall with only one adjacent second channel 230. Likewise, each second channel 230 shares a side wall with two adjacent first channels 220. There are no second channels 230 in FIG. 5 that are adjacent to a frame wall 410.

FIG. 6 is a top view of the frame 540 of FIG. 5 including a sealant 510 at third and fourth opposite ends according to disclosed embodiments. The frame 640 is like the frame 440 with the addition of the sealant 510.

The sealant 510 is a material that seals the open ends of the first and second channels 220, 230 along third and fourth edges of the frame 440 perpendicular to the first and second edges having the frame walls 410 to prevent air from leaking out of the open ends on the third and fourth edges of the frame 440.

In some embodiments, the sealant 510 will be a resin or an epoxy that is applied to the third and fourth edges of the frame 440 and hardened. However, alternate embodiments could employ any sealant that will provide an airtight seal along the open ends of the first and second channels 220, 230. In embodiments in which the sealant 510 is a resin or epoxy, the resin or epoxy may be formed inside a metal cap.

As shown in FIG. 6, the frame 640 includes the first and second channels 220, 230. The top view of FIG. 6 shows a first side of the frame 640. On this first side of the frame, the first channels 220 are open, revealing the first channels 220, while the second channels 230 are closed, showing the end walls for each second channel 230. In this way, the first side of the frame 640 will appear as an alternating set of trenches (first channels 220) and flat surfaces (second channels 230). The second side of the frame 640 (not shown in FIG. 6) would be the opposite, having the second channels 230 be open, revealing the second channels 220, while the first channels 220 would be closed, showing the end walls for each first channel 220. As with the first side of the frame 640, the second side of the frame 640 would appear as an alternating set of trenches (second channels 230) and flat surfaces) first channels 220).

FIG. 7 is a top view of the frame 640 of FIG. 6 including a first panel 710 on a first side forming a heat recovery core 740 according to disclosed embodiments. The heat recovery core 740 is like the frame 640 with the addition of the first panel 710 and a second panel 720 (not shown in FIG. 7).

As shown in FIG. 7, a first panel 710 is placed against the first surface of the frame 640 to block off a middle portion of the first trenches 220 such that air cannot escape from the middle portion of the first trenches 220 where the first trenches 220 are covered by the first panel 710. Thus, the first panel 710 is preferably pressed tightly against the first surface of the frame 640 and may be sealed against the frame 640 in some manner to prevent air leakage from the first trenches 220. The first panel 710 only seals off the first trenches 220 because only the first trenches 220 are open to the first side of the frame 640.

Although not shown in FIG. 7, a second panel 720 is placed against a second surface of the frame 640 opposite the first surface to block off a middle portion of the second trenches 230 such that air cannot escape from the middle portion of the second trenches 230 the where the second trenches 230 are covered by the second panel 720. Thus, the second panel 720 is preferably pressed tightly against the second surface of the frame 640 and may be sealed against the frame 640 in some manner to prevent air leakage from the second trenches 230. The second panel 720 only seals off the second trenches 230 because only the second trenches 230 are open to the second side of the frame 640.

In many embodiments, the middle portion of the first and second trenches 220, 230 will be much longer than the end portions of the first and second trenches 220, 230. For example, the in some embodiments a width A of the middle portion of the first and second trenches 220, 230 could be between five and twenty times a width B of the first end portion of the first and second trenches 220, 230 and a width C of the second end portion of the first and second trenches 220, 230. In some embodiments, the widths B and C of the end portions could be between 0.5 and 3 inches long, while the width A of the first and second panels could be between one and two feet. However, a heat recovery core 740 could be made of any size. Alternate relationships and dimensions of the width of the middle and end portions of the first and second trenches 220, 230 are possible. In some embodiments the widths B and C of the first and second end portions will be the same. In other embodiments the widths B and C of the first and second end portions can be different.

In various embodiments, the first and second panels 710, 720 can be made of any material or structure that will prevent air from escaping from the middle portions of the first and second trenches 220, 230. This material could include metal, plastic, or any other suitable material.

Figure 8:
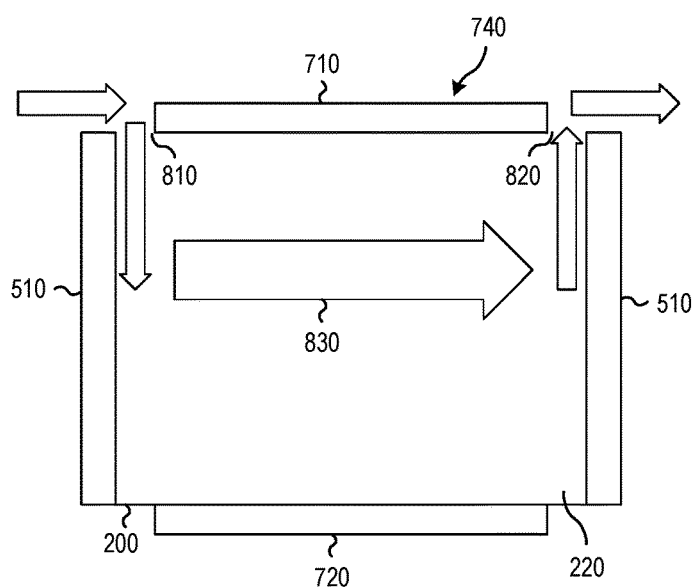
FIG. 8 is a side view of the heat recovery core of FIG. 7 along line VIII-VIII' showing air flow through a first channel according to disclosed embodiments.

FIG. 8 is a side view of the heat recovery core 740 of FIG. 7 along line VIII-VIII' showing air flow 830 through a first channel 220 according to disclosed embodiments.

As shown in FIG. 8, each of the first channels 220 is bound on two ends by the sealant 510 and on the bottom by the sheet 200 that was bent to make the frame 240, i.e., the end wall of the first channel 220. The side of each first channel 220 opposite the end wall of the sheet 200 is unbounded by the material of the sheet 200 that makes up the frame 240. However, the first panel 710 covers a middle portion of this opening. As a result, air can only enter or leave the first channel 220 by first and second openings 810, 820 on first and second ends of the first channel 220.

In addition, the second panel 720 is formed to cover a middle portion of the second side (the bottom side in FIG. 8) of the heat recovery core 740. However, since each of the first channels 220 is bound by the sheet 200 on the second side of the heat recovery core 740, the second panel 720 serves no role in restricting the flow of air through the first channels 220.

Although not shown in FIG. 8, the first channel 220 is also bound by sidewalls formed from the sheet 200 that was bent to make the frame 240. As noted above each of these sidewalls is shared with an adjacent second channel 230.

Air flow 830 enters the first channel 220 via the first opening 810 passes through the first channel 220 and exits the first channel 220 through the second opening 820. Since the first channel 220 is narrow, much of the air flowing through the first channel 220 will be adjacent to the two sidewalls and will exchange heat with air flowing through adjacent second channels 230.

Figure 9:
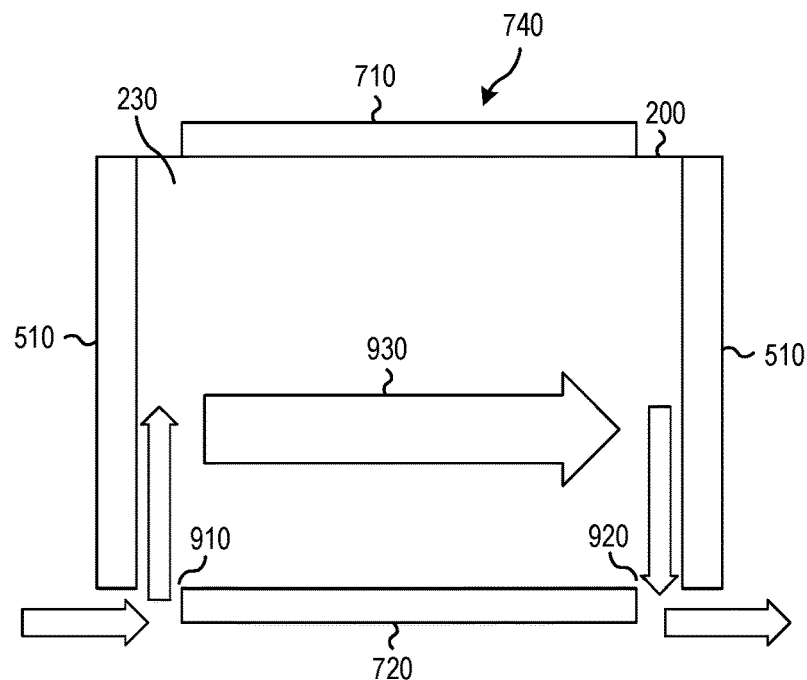
FIG. 9 is a side view of the heat recovery core of FIG. 7 along line IX-IX' showing air flow through a second channel according to disclosed embodiments.

FIG. 9 is a side view of the heat recovery core 740 of FIG. 7 along line IX-IX' showing air flow 930 through a second channel 230 according to disclosed embodiments.

As shown in FIG. 9, each of the second channels 230 is bound on two ends by the sealant 510 and on the top by the sheet 200 that was bent to make the frame 240, i.e., the end wall of the second channel 230. The side of each second channel 230 opposite the end wall of the sheet 200 is unbounded by the material of the sheet 200 that makes up the frame 240. However, the second panel 720 covers a middle portion of this opening. As a result, air can only enter or leave the second channel 230 by first and second openings 910, 920 on first and second ends of the second channel 230.

In addition, the first panel 710 is formed to cover a middle portion of the first side (the top side in FIG. 9) of the heat recovery core 740. However, since each of the second channel 230 is bound by the sheet 200 on the first side of the heat recovery core 740, the first panel 710 serves no role in restricting the flow of air through the second channel 230.

Although not shown in FIG. 9, the second channel 230 is also bound by sidewalls formed from the sheet 200 that was bent to make the frame 240. As noted above each of these sidewalls is shared with an adjacent first channel 220.

Air flow 930 enters the second channel 230 via the first opening 910 passes through the second channel 230 and exits the second channel 230 through the second opening 920. Since the second channel 230 is narrow, much of the air flowing through the second channel 230 will be adjacent to the two sidewalls and will exchange heat with air flowing through adjacent first channels 220.

Impressions Formed in the Frame

Although some embodiments of the disclosed heat recovery core may employ smooth sidewalls in the first and second channels, others will provide impressions on the sides of the first and second channels. These impressions are convex or concave structures that form a cavity on one side of a sidewall in a first or second channel and form a raised portion on the other side of the side wall in an adjacent first or second channel. For example, an impression on one side wall between a first channel and a second channel might create a hollow portion facing the first channel and a bump facing the adjacent second channel. Another impression on another side wall between a first channel and a second channel might create a hollow portion facing the second channel and a bump facing the adjacent first channel.

Generally, these impressions will maintain the thickness of the side wall such that the material of the sidewall will still effectively transfer heat between air in adjacent first and second channels.

The impressions serve multiple purposes in the heat recovery core. Since they extend into the first and second channels, the impressions will set and maintain a proper spacing of the channels by forcing a minimum channel width by not allowing the first and second channels to get any closer that the length the impressions extend into the channel. Furthermore, by expanding a flat side wall into a convex or a concave portion, the impressions will increase the surface area of the side walls. This will have the effect of increasing heat transfer efficiency since there is more surface area on the side walls to transfer heat. The presence of the convex and concave parts of the impressions will also induce air turbulence into the air flows in the first and second channels, thereby reducing laminar flow, mixing the air in the channels, and increasing heat exchange. The impressions will also increase the amount of distance or time the air has contact with the side walls, which will further increase heat transfer between air flows in adjacent first and second channels.

For ease of manufacture, the impressions may be made in a heat-conductive sheet before it is bent into a frame with first and second channels. In this case, the pattern of impressions made in the heat-conductive sheet may be arranged such that the impressions will not interact with each other in a disadvantageous manner when the sheet is folded into a frame. For example, if two impressions of a similar shape were formed on adjacent walls in the same position and extending in the same direction in a frame, they might nest with each other, preventing one of the impressions from maintaining a minimum width for the channel. Likewise, if two impressions were formed on adjacent walls in the same position and extending in different directions in a frame, they might push against each other, causing the channel they extended into to be too wide or even obscuring the channel and making it difficult for air to flow through it. Therefore, when making impressions on a flat sheet prior to bending, it can be helpful to arrange the impressions such that when the sheet is bent into a frame, the impressions will not interact with each other in a way that reduces the effectiveness of the resulting heat recovery core.

Figure 10:
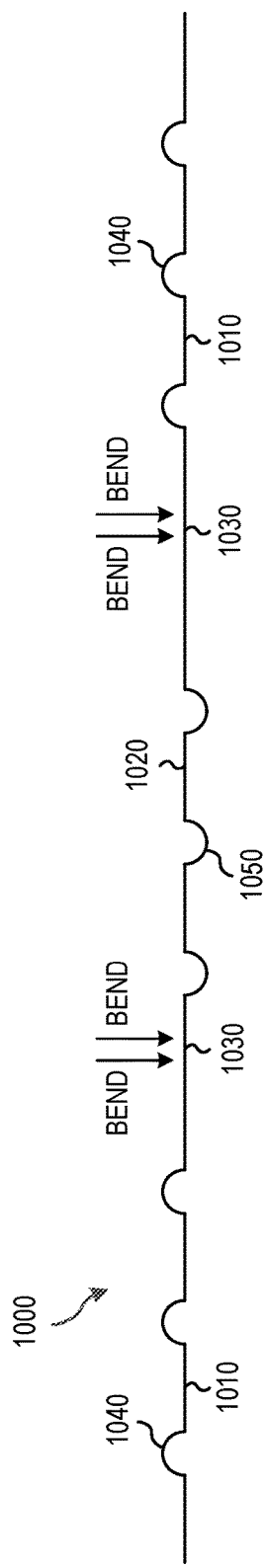
FIG. 10 is side view of a heat-conductive sheet prior to being folded into a frame showing a plurality of impressions according to disclosed embodiments.

FIG. 10 is side view of a sheet 1000 prior to being folded into a frame showing a plurality of impressions 1040, 1050 according to disclosed embodiments.

As shown in FIG. 10, the sheet 1000 is generally flat. When folded, the sheet 1000 will form a frame with alternating first walls 1010 and second walls 1020. Adjacent first walls 1010 and second walls 1020 will be connected by end walls 1030 whose position alternates between one end of the first and second walls 1010, 1020 and the other end of the first and second walls 1010, 1020. The length of the sheet 1000 1010 thus be divided into a portion that will become a first wall 1010 of a channel, a portion that will become an end wall 1030 of a channel, and a portion that will become a second wall 1020 of a channel. This pattern can be repeated as many times as necessary.

Each portion of the sheet 1000 that will become a first wall 1010 will have a particular pattern of first impressions 1040 formed in it. In the example of FIG. 10, three first impressions 1040 are shown extending from the bottom of the sheet 1000 out from the top of the sheet 1000. Thus, each of the first impressions 1040 has a concave portion on the bottom of the sheet 1000 and a convex portion on the top of the sheet 1000.

Similarly, each portion of the sheet 1000 that will become a second wall 1020 will have a particular pattern of second impressions 1050 formed in it. In the example of FIG. 10, three second impressions 1050 are shown extending from the top of the sheet 1000 out from the bottom of the sheet 1000. Thus, each of the second impressions 1050 has a concave portion on the top of the sheet 1000 and a convex portion on the bottom of the sheet 1000.

The portion of the sheet 1000 that will become an end portion 1030 does not have any impressions formed in it.

The arrangement of the first impressions 1040 and second impressions 1050 can be arranged with consideration for how the sheet 1000 will be bent to form a frame, and how the first impressions 1040 and the second impressions 1050 will interact with each other. For example, the first impressions 1040 and the second impressions 1050 in FIG. 10 are arranged such that they will be in different lateral positions with respect to each other and so will not interfere with each other. Furthermore, because of the way the sheet 1000 will be bent, the first impressions 1040 are arranged to extend upward from the sheet 1000 and the second impressions 1050 are arranged to extend downward from the sheet 1000. By having this alternating pattern of impressions 1040, 1050, the resulting frame will have the first and second impressions 1040, 1050 all extending in the same direction with respect to each other.

In some embodiments, each portion of the sheet 1000 that will become a first wall 1010 will have the same pattern of first impressions 1040 formed in it, and each portion of the sheet 1000 that will become a second wall 1020 will have the same pattern of second impressions 1050 formed in it. However, this is by way of example only. Using a repeating pattern can simplify design and manufacture by allowing the same pattern of first impressions 1040 and second impressions 1050 to be used on pairs of first and second walls 1010, 1020. Alternate embodiments could use more complex patterns, nonrepeating patterns, etc. So long as the first and second impressions 1040, 1050 do not interfere with each other, any set of first and second impressions 1040, 1050 can be used.

Furthermore, various embodiments can use more or fewer impressions 1040, 1050 on different first and second walls 1010, 1020, can vary the size and shape of the impressions 1040, 1050, and can alter the position of the impressions 1040, 1050. Also, although the embodiment of FIG. 10 shows that all the first impressions 1040 are formed to extend in the same direction, and all of the second impressions 1050 are formed to extend in the same direction, this is by way of example only. Alternate embodiments could have either or both of the first and second impressions 1040, 1050 having a mix of directions in which they extend.

Figure 11:
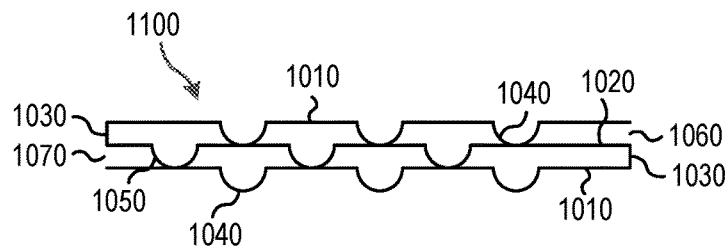
FIG. 11 is side view of a frame after being folded showing a plurality of impressions according to disclosed embodiments.

FIG. 11 is side view of a frame 1100 after being folded showing a plurality of impressions 1040, 1050 according to disclosed embodiments. This frame 1100 corresponds to the sheet 1000 of FIG. 10 after it has been folded.

As shown in FIG. 11, the frame 1100 is formed of a series of a first wall 1010, a second wall 1020, and a first wall 1010, each connected by an end wall 1030, with the end walls 1030 on alternating ends of the first and second walls 1010, 1020. A first channel 1060 is formed by one of the first walls 1010, one of the end walls 1030, and the second wall 1020. Similarly, a second channel 1070 is formed by the other of the first walls 1010, the other of the end walls 1030, and the second wall 1020. Thus, the first and second channels 1060, 1070 share a common second wall 1020. In FIG. 11, first impressions 1040 extend downward from the first walls 1010 into the first channel 1060, and second impressions 1050 extend downward from the second wall 1020 into the second channel 1070.

The first and second impressions 1040, 1050 are arranged such that in the frame 1100, the first impressions 1040 are offset from the second impressions 1050 in a lateral direction such that the two do not interfere with each other. Each set of first impressions 1040 helps maintain the width of the first channel 1060, while each set of second impressions 1050 helps maintain the width of the second channel 1070.

Although FIG. 11 only shows a frame with a single first channel 1060 and a single second channel 1070, this pattern can be repeated as many times as are necessary to obtain a frame with a desired number of first and second channels 1060, 1070.

Furthermore, as noted above, the repeated sets of first and second channels 1060, 1070 need not have an identical arrangement of first and second impressions 1040, 1050. While some embodiments will employ a repeated pattern of first and second impressions 1040, 10504 reasons of convenience or simplicity, this is not required. Also, although the embodiment of FIG. 11 shows that all the first impressions 1040 are formed to extend in the same direction, and all of the second impressions 1050 are formed to extend in the same direction, this is by way of example only. Alternate embodiments could have either or both of the first and second impressions 1040, 1050 having a mix of directions in which they extend.

Figure 12:
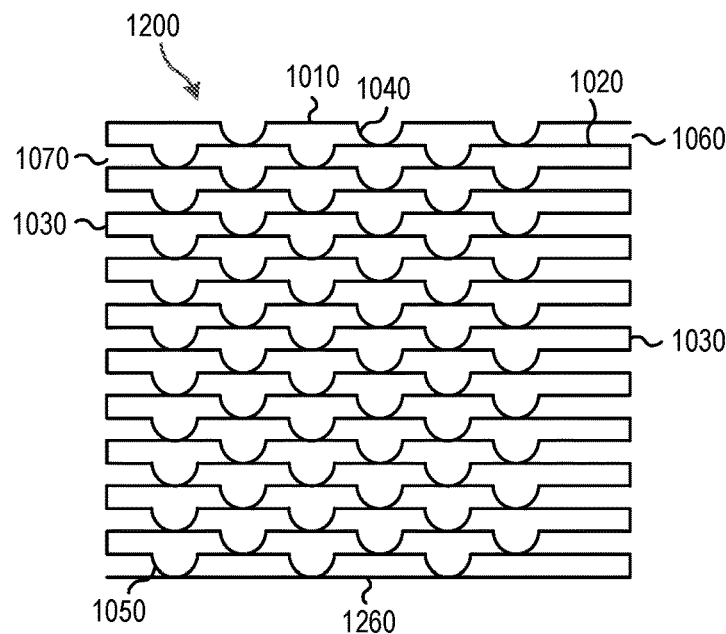
FIG. 12 is side view of a heat-conductive sheet after being folded into a frame showing a plurality of impressions and an end wall according to disclosed embodiments.

FIG. 12 is side view of a frame 1200 after being folded showing a plurality of impressions 1040, 1050 and an end wall 1260 according to disclosed embodiments. This frame 1200 is made by repeating the pattern of the frame 1100 multiple times.

As shown in FIG. 12, the frame 1200 is formed of a series of first walls 1010 and second walls 1020s, each connected by an end wall 1030, with the end walls 1030 on alternating ends of the first and second walls 1010, 1020. A plurality of first channels 1060 are formed by sets of first wall 1010 and a second wall 1020 connected by an end wall 1030 on a first end of the frame 1200. Similarly, a plurality of second channels 1070 are formed by sets of first wall 1010 and a second wall 1020 connected by an end wall 1030 on a second end of the frame 1200.

Each first channel 1060 shares a common first wall 1010 with one adjacent second channel 1070 and a common second wall 1020 with another adjacent second channel 1070. Likewise, each second channel 1070 shares a common first wall 1010 with one adjacent first channel 1060, and common second wall 1020 with another adjacent first channel 1060. The only exceptions to this are the first channel 1060 on the top of the frame 1200, which only shares a common second wall 1020 with one adjacent second channel 1070, and the second channel 1070 on the bottom of the frame 1200, which only shares a common second wall 1020 with one adjacent first channel 1060. This would be true for any channel formed at the end of the frame 1200 in different embodiments whether it was a first channel 1060 or a second channel 1070.

Furthermore, in addition to a repeating pattern of first and second walls 1010, 1020, the frame 1200 of FIG. 12 includes a third wall 1260, which forms a second side wall for the second channel 1070 at the bottom of the frame 1200. This third wall 1260 does not include any impressions since there is no channel below the third wall 1260. Alternate embodiments could include impressions in the third wall, though they are not necessary.

In FIG. 12, first impressions 1040 extend downward from the first walls 1010 into the first channels 1060, and second impressions 1050 extend downward from the second walls 1020 into the second channels 1070.

As in FIG. 11, the first and second impressions 1040, 1050 are arranged such that in the frame 1200, the first impressions 1040 are offset from the second impressions 1050 such that they to do not interfere with each other. Each set of first impressions 1040 helps maintain the width of the first channels 1060, while each set of second impressions 1050 helps maintain the width of the second channels 1070.

Although FIG. 12 only shows a frame with ten first channels 1060 and ten second channels 1070, this is by way of example only. The frame 1200 can include any desired number of alternating first and second channels 1060, 1070. Furthermore, the number of first and second channels 1060, 1070 may not be identical. Various embodiments could have one extra first channel 1060 or one extra second channel 1070, depending upon what channels 1060, 1070 are located at either end of the frame 1200.

Furthermore, as noted above, the repeated sets of first and second channels 1060, 1070 need not have an identical arrangement of first and second impressions 1040, 1050. While some embodiments will employ a repeated pattern of first and second impressions 1040, 1050 for reasons of convenience or simplicity, this is not required. Also, although the embodiment of FIG. 12 shows that all the first impressions 1040 are formed to extend in the same direction, and all of the second impressions 1050 are formed to extend in the same direction, this is by way of example only. Alternate embodiments could have either or both of the first and second impressions 1040, 1050 having a mix of directions in which they extend.

Examples of Types of Impressions

Various patterns of impressions can be used in different embodiments. Some impressions will be small, individual impressions scattered across a side wall; other impressions will be extended impressions that traverse larger portions of a side wall. FIGS. 13-16 show two examples of impression patterns that can be used in different embodiments. However, these are provided by way of example only. Many other impression patterns can be used in alternate embodiments.

Figure 13:
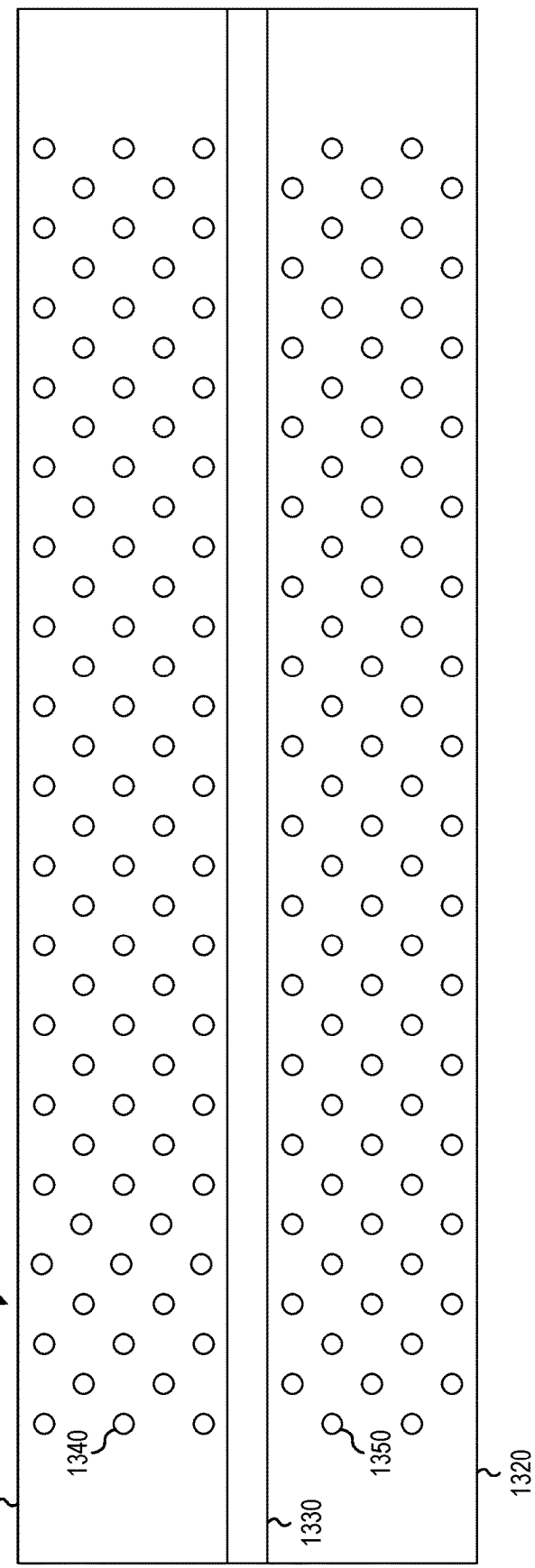
FIG. 13 is a top view of a heat-conductive sheet prior to being folded into a frame showing a plurality of circular impressions according to disclosed embodiments.

FIG. 13 is a top view of a sheet 1300 prior to being folded into a frame showing a plurality of circular impressions 1340, 1350 according to disclosed embodiments.

As shown in FIG. 13, the circular impressions 1340, 1350 are divided up into first circular impressions 1340 formed in a first pattern on a portion of the sheet 1300 that will form a first side wall 1310, and second circular impressions 1350 formed in a second pattern on a portion of the sheet 1300 that will form a second side wall 1320. No impressions are formed on a portion of the sheet 1300 that will form an end wall 1330, though impressions could be formed on the end walls in other embodiments.

By forming the first and second circular impressions 1340, 1350 on the sheet 1300 prior to being folded into a frame, the impressions 1340, 1350 can be created more easily. For example, a pressing machine or a roller can be applied to a flat sheet 1300. Adding impressions to the side walls of a folded frame would be more challenging.

In various embodiments, the circular impressions 1340, 1350 can extend in either direction from the sheet 1300. In any embodiment that uses the circular impressions 1340, 1350 to provide separation between sidewalls, the circular impressions 1340, 1350 should be arranged such that at least one impression will extend into every first and second channel in a resulting frame.

In the embodiment of FIG. 13, the first pattern of first impressions 1340 and the second pattern of the second circular impressions 1350 are arranged such that when the flat sheet 1300 is folded into a frame, none of the first circular impressions 1340 will be opposite a second circular impression 1350 in an adjacent side wall 1310, 1320, and none of the second circular impressions 1350 will be opposite a first circular impression 1340 in an adjacent side wall 1310, 1320.

Figure 14:
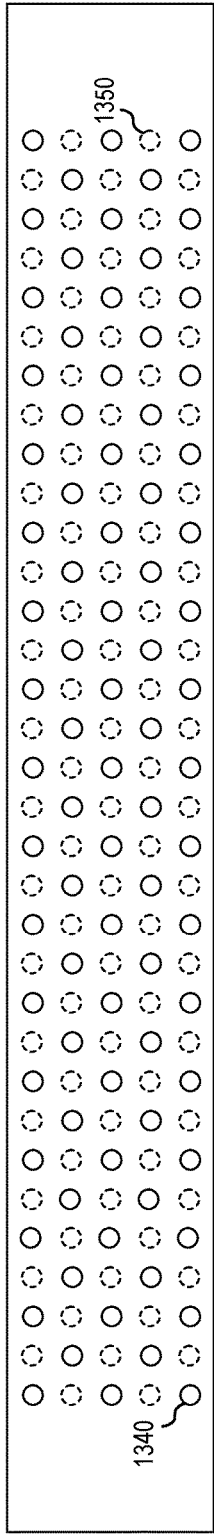
FIG. 14 is a top view of a frame after being folded showing a plurality of circular impressions according to disclosed embodiments.

FIG. 14 is a top view of a frame 1400 after being folded showing a plurality of circular impressions 1340, 1350 according to disclosed embodiments. The frame 1400 corresponds to the flat sheet 1300 of FIG. 13 when it has been folded.

As shown in FIG. 14, the first circular impressions 1340 in the first side wall 1310 are formed in a first pattern. Since the first side wall 1310 is visible in the view of FIG. 14, the first circular impressions 1340 can be seen on the surface of the first side wall 1310. These first circular impressions 1340 can be extending out of the first side wall 1310 away from the frame 1400, extending into the first side wall 1310 further into the frame 1400, or a mix of extending from the first side wall away from the frame 1400 or into the frame 1400.

The second side wall 1320 is obscured by the first side wall 1310, since the second side wall 1320 has been folded under so that it is beneath the first side wall 1310, forming an air channel in between the two. However, the position of the second circular impressions 1350 on the second side wall 1320 with respect to the first circular impressions 1340 are shown using circles having dashed lines. As can be seen in FIG. 14, when the first and second side walls 1310, 1320 are folded such that they oppose each other, the first circular impressions 1340 in the first pattern and the second circular impressions 1350 in the second pattern are arranged such that no first circular impression 1340 is formed opposite a second impression 1350 across an air channel.

Figure 15:
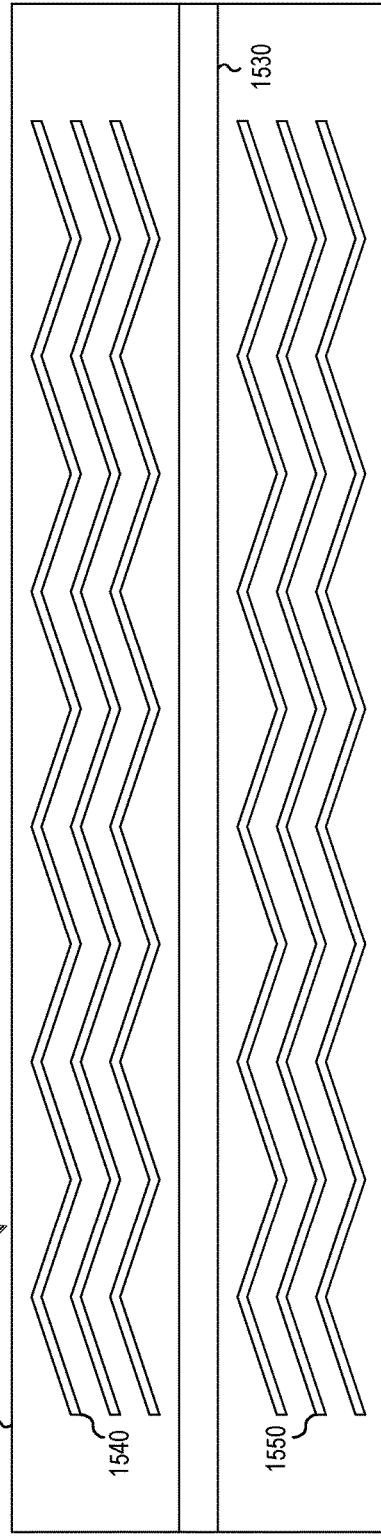
FIG. 15 is a top view of a heat-conductive sheet prior to being folded into a frame showing a plurality of zig-zag impressions according to disclosed embodiments.

FIG. 15 is a top view of a sheet 1500 prior to being folded into a frame showing a plurality of zig-zag impressions 1540, 1550 according to disclosed embodiments.

As shown in FIG. 15, the zig-zag impressions 1540, 1550 are divided up into first zig-zag impressions 1540 formed in a first pattern on a portion of the sheet 1500 that will form a first side wall 1510, and second zig-zag impressions 1550 formed in a second pattern on a portion of the sheet 1500 that will form a second side wall 1520. No impressions are formed on a portion of the sheet 1500 that will form an end wall 1530, though impressions could be formed on the end walls in other embodiments.

In the disclosed embodiment, three long first zig-zag trenches are formed in the portion of the sheet 1500 that will become a first side wall 1510 when the sheet 1500 is folded to become a frame. Similarly, three long second zig-zag trenches are formed in the portion of the sheet 1500 that will become a second side wall 1520 when the sheet 1500 is folded to become a frame. Unlike the embodiment of FIG. 13, the first pattern of the first zig-zag impressions 1540 is the same as the second pattern of the second is a-zag impressions 1550. This is because when the first and second side walls 1510, 1520 are folded to form the frame, the patterns will appear opposite with respect to each other because one of the sidewalls 1510, 1520 has been flipped with respect to the other side wall 1510, 1520.

By forming the first and second zig-zag impressions 1540, 1550 on the sheet 1500 prior to being folded into a frame, the zig-zag impressions 1540, 1550 can be made more easily. For example, a pressing machine or a roller can be applied to the flat sheet 1500 much more easily than impressions could be added to sidewalls in air channels after a frame is folded.

In various embodiments, the zig-zag impressions 1540, 1550 can extend in either direction from the sheet 1500. In any embodiment that uses the zig-zag impressions 1540, 1550 to provide separation between sidewalls, the zig-zag impressions 1540, 1550 should be arranged such that at least one impression will extend into every first and second channel in a resulting frame.

In the embodiment of FIG. 15, the first pattern of first zag-zag impressions 1540 and the second pattern of the second zig-zag impressions 1550 are arranged such that when the flat sheet 1500 is folded into a frame, the first zag-zag impressions 1540 will have a different pattern with respect to the second zig-zag impressions 1550 in an adjacent side wall 1510, 1520. If the first and second zig-zag impressions 1540, 1550 extend in the same direction, this will ensure that the first and second zig-zag impressions 1540, 1550 do not nest within each other in the folded frame.

Figure 16:
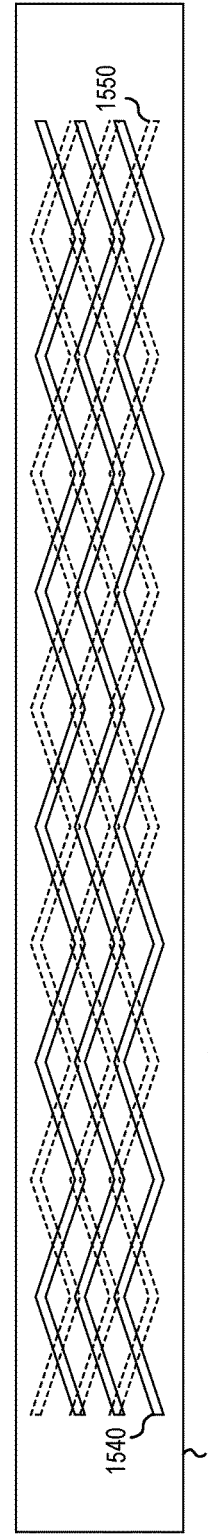
FIG. 16 is a top view of a frame after being folded showing a plurality of zig-zag impressions according to disclosed embodiments.

FIG. 16 is a top view of a frame 1600 after being folded showing a plurality of zig-zag impressions 1540, 1550 according to disclosed embodiments. The frame 1600 corresponds to the flat sheet 1500 when it has been folded.

As shown in FIG. 16, the first zig-zag impressions 1540 in the first side wall 1510 are formed in a first pattern. Since the first side wall 1510 is visible in the view of FIG. 16, the first zig-zag impressions 1540 can be seen on the surface of the first side wall 1510. These first zig-zag impressions 1540 can be extending out of the first side wall 1510 away from the frame 1600 or extending into the first side wall 1510 further into the frame 1600.

The second side wall 1520 is obscured by the first side wall 1510, since the second side wall 1520 has been folded under so that it is beneath the first side wall 1510, forming an air channel in between the two. However, the position of the second zig-zag impressions 1550 on the second side wall 1520 with respect to the first zig-zag impressions 1540 are shown using zig-zag patterns having dashed lines. As can be seen in FIG. 16, when the first and second side walls 1510, 1520 are folded such that they oppose each other, the first zig-zag impressions 1540 in the first pattern and the second zig-zag impressions 1550 in the second pattern are arranged such that they are not the same and will not nest within each other.

Heat Recovery Ventilator/Energy Recovery Ventilator

Figure 17:
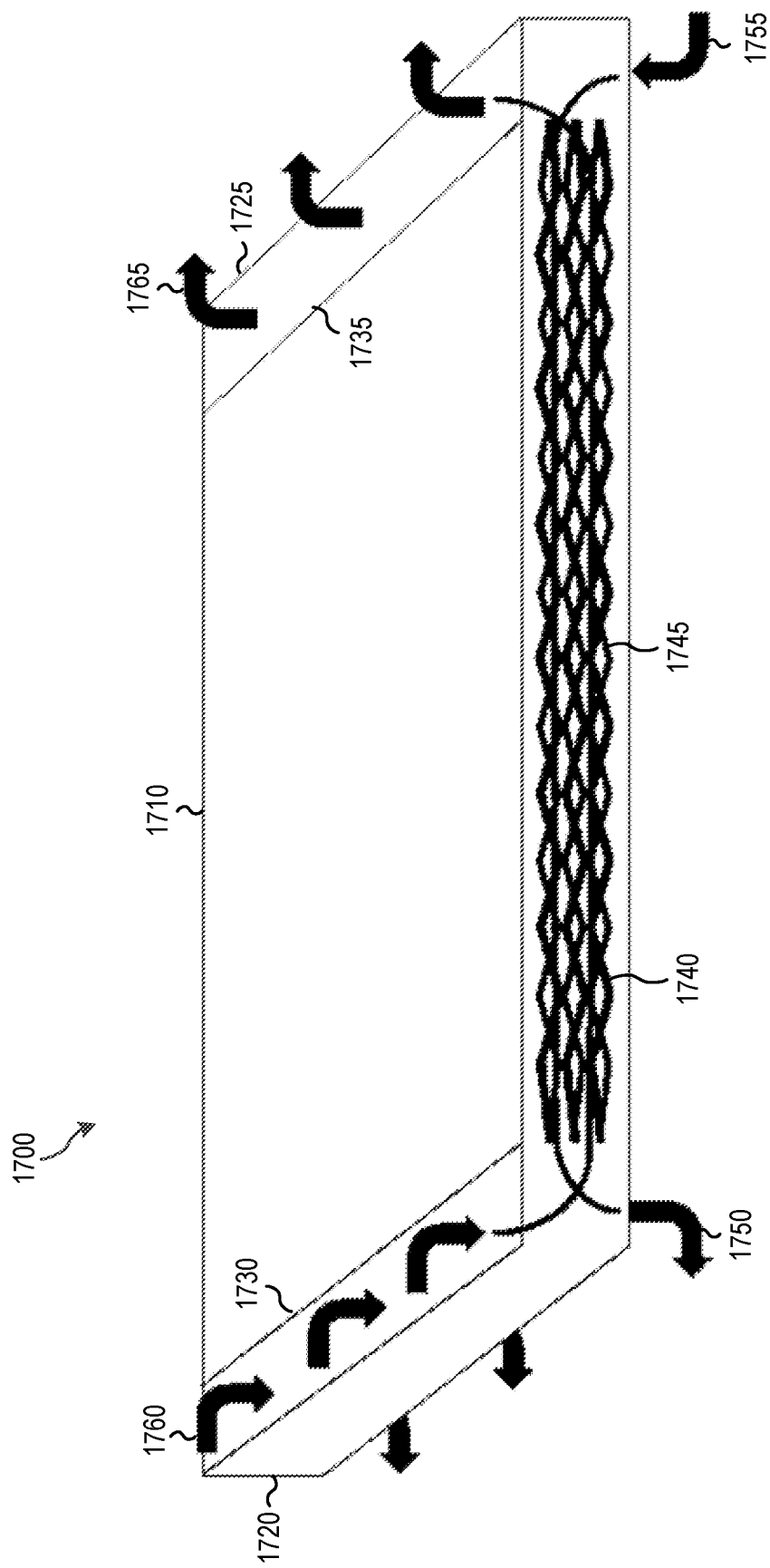
FIG. 17 is an isometric view of a heat recovery ventilator or energy recovery ventilator including a heat recovery core a heat recovery core having first and second channels according to disclosed embodiments.

FIG. 17 is an isometric view of a heat recovery ventilator (HRV) or energy recovery ventilator (ERV) 1700 including a heat recovery core 1710 having first and second channels according to disclosed embodiments.

As shown in FIG. 17, the HRV or ERV 1700 includes an air-to-air heat recovery core 1710, an intake vent 1730 at a first end 1720, and a supply vent 1735 at a second end 1725. Not shown in FIG. 17 is an exhaust vent on the first end 1720 beneath the intake vent 1730 and a return vent on the second end 1725 beneath the supply vent 1735. In addition, although the details of the heat recovery core 1710 are not shown in detail, illustration of how the first impressions 1740 in a first channel and the second impressions 7045 in a second channel are arranged is shown by way of illustration.

The air-to-air heat recovery core 1710 is a structure as shown in the various embodiments of FIGS. 7 and 10-16 by the heat recovery core 740 and the various embodiments of a frame 1100, 1200, 1400, 1600 that can be used to make a heat recovery core 740. The heat recovery core 1710 includes a plurality of alternating first and second air channels through which air can only enter or leave through openings at opposite ends. These opposite ends correspond to the location first end 1720, and the second end 1725.

The intake vent 1730 is located at a first end 1720 of the heat recovery core 1710 and corresponds to a first opening in the first air channels of the heat recovery core 1710. The supply vent 1735 is located at a second end 1725 of the heat recovery core 1710 and corresponds to a second opening in the first air channels of the heat recovery core 1710. Intake air 1760 is drawn into the intake vent 1730 at the first end 1720 from an outside environment, passes into the first air channels and through the first air channels to the supply vent at the second end 1725, and will pass through the supply vent 1735 into an interior of a space to be heated or cooled as supply air 1765.

The exhaust vent (1830 in FIG. 18) is located on the first end 1720 beneath the intake vent 1730. The return vent (1835 in FIG. 18) is located on the second end 1725 beneath the supply vent 1735 and beneath the supply vent 1735. The exhaust vent 1830 and the return vent 1835 are obscured by the body of the heat recovery core 1710 in FIG. 17. Return air 1755 is drawn into the return vent 1835 at the second end 1725 from an interior of the space to be heated or cooled, passes into the second air channels and through the second air channels to the exhaust vent at the first end 1720, and will pass through the exhaust vent 1830 into an outside environment as exhaust air 1750.

The return air 1755 is typically at an indoor temperature near or at a desired temperature (an HVAC set point temperature), while the outside air 1760 is at an outdoor temperature, which is different from the desired temperature. When it is cold outside, the outdoor temperature is lower than the indoor temperature since the HVAC system is performing a heating operation; and when it is hot outside, the outdoor temperature is hotter than the indoor temperature since the HVAC system is performing a cooling operation.

The first impressions 1740 in a first channel are in a zig-zag pattern that is different from the second impressions 1745 in a second channel that are also in a zig-zag pattern.

Since these first and second impression 1740, 1745 are in different patterns, they will not interfere with each other in a destructive way.

Figure 18:
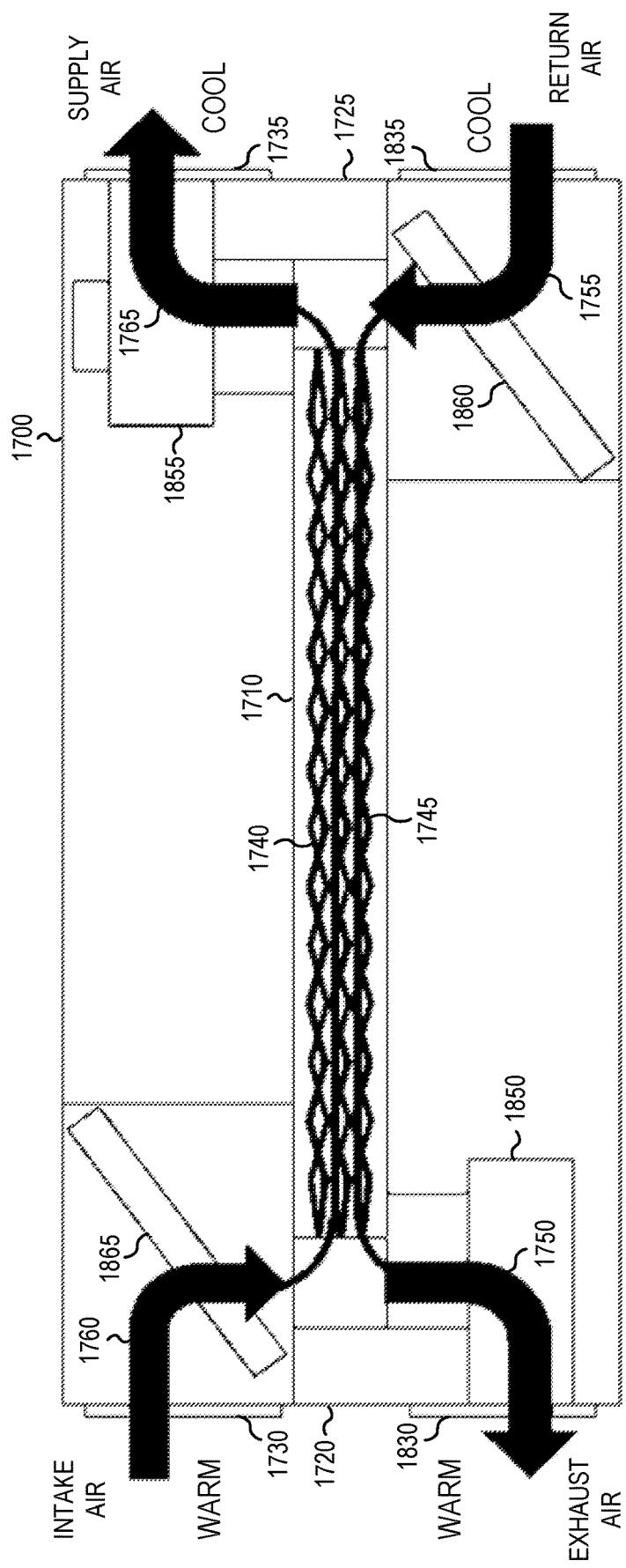
FIG. 18 is a side view of the heat recovery ventilator or energy recovery ventilator of FIG. 17 according to disclosed embodiments.

FIG. 18 is a side view of a heat recovery ventilator (HRV) or energy recovery ventilator (ERV) 1700 including the heat recovery core 1710 of FIG. 17 according to disclosed embodiments.

As shown in FIG. 18, the HRV or ERV 1700 includes an air-to-air heat recovery core 1710, an intake vent 1730, a supply vent 1735, an exhaust vent 1830, a return vent 1835, a first blower 1850, a second blower 1855, a first filter 1860, and a second filter 1865. In addition, although the details of the heat recovery core 1710 are not shown in detail, illustration of how the first impressions 1740 in a first channel and the second impressions 7045 in a second channel are arranged is shown by way of illustration.

The air-to-air heat recovery core 1710, the intake vent 1730, the supply vent 1735, the exhaust vent 1830, and the return vent 1835 are discussed above with respect to FIG. 17. These elements operate as described above, and their description will not be repeated here for the sake of brevity.

The first blower 1850 is located at a first side 1720 of the HRV or ERV 1700 proximate to the exhaust vent 1830 and operates to draw return air 1755 from an indoor space into the second air channels via the return vent 1835, through the second air channels, and to the outdoor environment as exhaust air 1750 via the exhaust vent 1830.

The second blower 1855 is located at a second side 1725 of the HRV or ERV 1700 proximate to the supply vent 1735 and operates to draw intake air 1760 from the outdoor environment into the first air channels via the intake vent 1730, through the first air channels, and to the indoor space as supply air 1765 via the supply vent 1735.

The first filter 1860 is located at a second side 1725 of the HRV or ERV 1700 proximate to the return vent 1835 and operates to filter particulate matter from the return air 1755 from the interior space before it is provided to the exterior environment as exhaust air 1750.

The second filter 1865 is located at a first side 1720 of the HRV or ERV 1700 proximate to the intake vent 1730 and operates to filter particulate matter from the intake air 1760 from the outdoor environment before it is provided to the indoor space as supply air 1765.

Although in the embodiment of FIG. 18, the first blower 1850 is located proximate to the exhaust vent 1830 and the first filter 1860 is located proximate to the return vent 1835, this is by way of example only. The first blower 1850 and the first filter 1860 need only be placed proximate to the first air channels such that the first blower 1850 can push air through the first air channels and the first filter 1860 can filter air passing through the first air channels.

Similarly, although in the embodiment of FIG. 18, the second blower 1855 is located proximate to the supply vent 1735 and the second filter 1865 is located proximate to the intake vent 1730, this is by way of example only. The second blower 1855 and the second filter 1865 need only be placed proximate to the second air channels such that the second blower 1855 can push air through the second air channels and the second filter 1865 can filter air passing through the first air channels.

For ease of disclosure, a situation in which the HVAC system is performing a cooling operation when it is hot outside will be described. However, the general description is equally applicable to a situation in which the HVAC system is performing a heating operation when it is cold outside, save that heat will be transferred between air flows in the first and second channels in the opposite direction.

During a cooling operation, indoor air in an indoor space will be relatively cool compared to outdoor air in the outdoor environment. This is because the HVAC system has been operating to cool the indoor air to a desired temperature. Thus, the return air drawn from the indoor space will be cooler than the intake air drawn from the outdoor environment. To minimize the power consumption of the HVAC system, it would be desirable for the supply air provided to the indoor space to be as cool as possible, and as close in temperature to the temperature of the return air as possible. Since the exhaust air is being provided to the outdoor environment, the system does not care how warm the exhaust air becomes.

As the return air 1755 passes through the first air channels in the heat recovery core 1710, and the intake air 1760 passes through the second air channels in the heat recovery core 1710, these two airflows will exchange heat with each other through the common side walls between the first and second air channels. Given the large surface areas of the common side walls and the added effects of the first and second impressions 1740, 1745 in the side walls, this heat transfer can be very effective, potentially reaching or exceeding 90% effectiveness. For example, if the intake air 1760 were 95° F. and the return air 1755 were 75° F., the exhaust air 1750 might be heated to 94° F. and the supply air 1765 might be cooled to 77° F. by the heat exchange in the heat recovery core 1710.

Furthermore, although FIGS. 17 and 18 show the return air 1755 passing through all the first air channels once in parallel as it exchanges heat with the intake air 1760 to generate the exhaust air 1750, this is by way of example only. Alternate embodiments could connect some of the first air channels together in parallel and some of the first air channels together in series through the use of connecting vents such that the return air 1755 passes through some of the first air channels in parallel, but others in series. This could effectively reduce the number of first air channels but increase their apparent length. For example, if the first air channels were divided into three equal portions, the return air 1755 could enter the first portion of the first air channels at the second end 1725, pass through the first portion of the first air channels, be routed from the first portion of the first air channels to a second portion of the first air at the first end 1720, pass through the second portion of the first air channels, be routed from the second portion of the first air channels to a third portion of the first air channels at the second end 1725, pass through the third portion of the first air channels, and be expelled at the first end 1720 through the exhaust vent 1830 as exhaust air 1750.

Likewise, although FIGS. 17 and 18 show the intake air 1760 passing through all the second air channels once in parallel as it exchanges heat with the return air 1755 to generate the supply air 1765, this is by way of example only. Alternate embodiments could connect some of the second air channels together in parallel and some of the second air channels together in series through the use of connecting events such that the intake air 1760 passes through some of the second air channels in parallel, but others in series. This could effectively reduce the number of second air channels but increase their apparent length. For example, if the second air channels were divided into three equal portions, the intake air 1760 could enter the first portion of the second air channels at the first end 1720, pass through the first portion of the second air channels, be routed from the first portion of the second air channels to a second portion of the second air channels at the second end 1725, pass through the second portion of the second air channels, be routed from the second portion of the second air channels to a third portion of the second air channels at the first end 1720, pass through the third portion of the second air channels, and be expelled at the first second end 1725 through the supply vent 1735 as supply air 1765.

In this way, the return air 1755 and the intake air 1760 would pass through fewer air paths in the air channels, but each air channel would have an effectively greater length for the air to pass through and exchange heat with each other. Other configurations are possible dividing up the first and second air channels as desired into more or fewer portions. Some embodiments it could even arrange the first and second air channels in different configurations.

Method of Creating a Frame for a Heat Recovery Core

Figure 19:
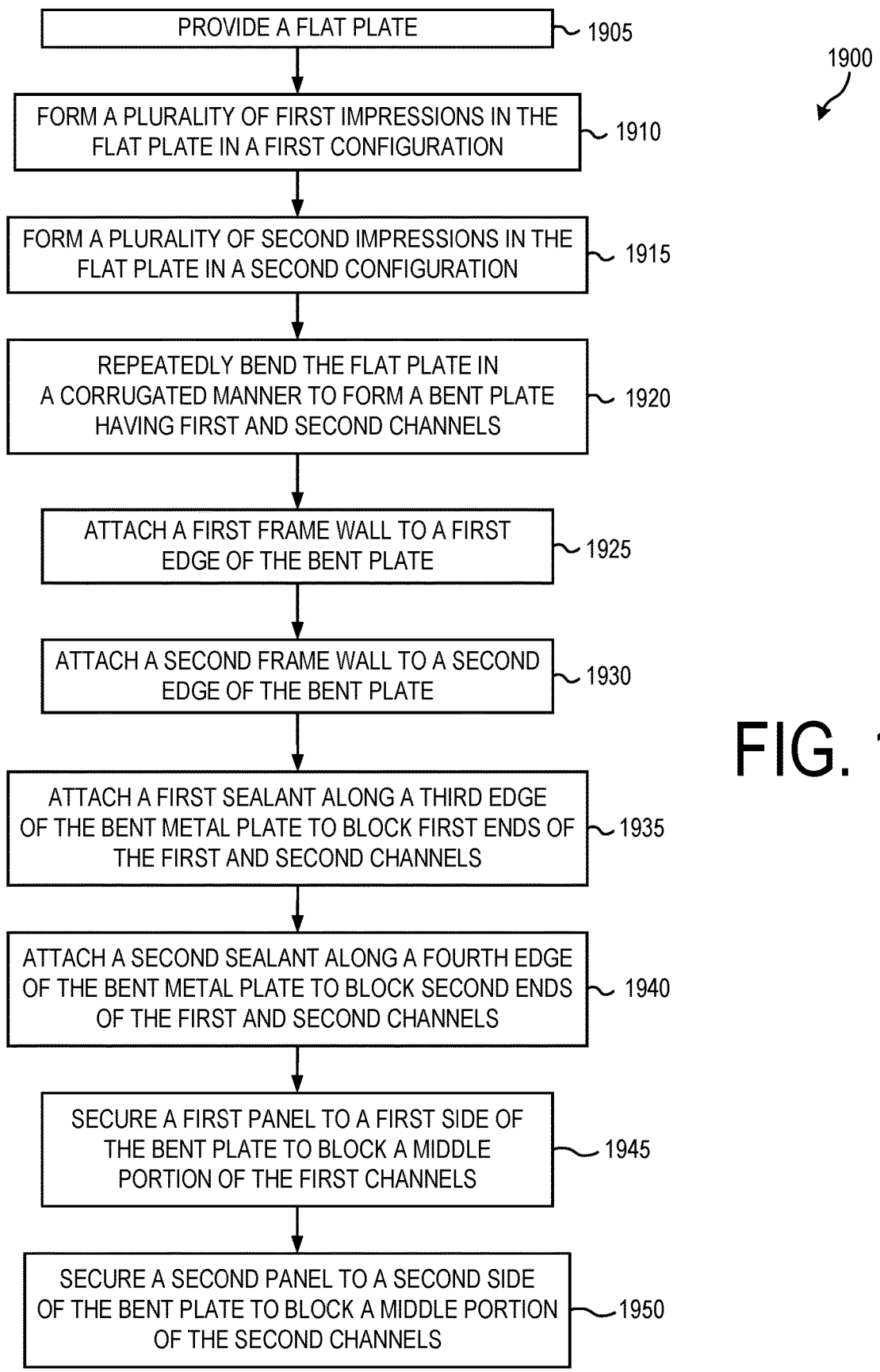
FIG. 19 is a flow chart showing a method of creating a heat recovery core for a heat recovery ventilator or energy recovery ventilator according to disclosed embodiments.

FIG. 19 is a flow chart 1900 showing a method of creating a frame for a heat recovery core according to disclosed embodiments.

As shown in FIG. 19, the operation begins by providing a flat plate or sheet of a bendable, heat-conductive material (1905). In some embodiments, the plate can be made of a metal, such as aluminum. In other embodiments, the plate can be formed of a plastic that could be bent in a press mold or similar device. In alternate embodiments, the plate can be formed of a moisture-permeable material, such as hydroponic resin or cellulose fiber. Using a moisture-permeable material will allow for not only heat transfer (as used in a HRV) but also moisture transfer (as used in an ERV).

A plurality of first impressions are then formed on the flat plate in a first configuration (1910), and a plurality of second impressions are formed on the flat plate in a second configuration (1915). As noted above, these impressions can be a large number of small impressions, a small number of larger impressions, or a mix of the two.

The flat plate is then repeatedly bent in a corrugated manner to form a bent plate as a frame having first and second alternating channels (1920). The first channels will open on a first side of the frame and be sealed on a second side of the frame opposite the first side, while the second channels will open on the second side of the frame and be sealed on the first side of the frame.

In some embodiments, the length of sidewalls of the first and second channels could be between four and ten times the length of end walls of the first and second channels. In some embodiments, the sidewalls will be in the range of 0.5 inches to 6 inches, and the end walls could be in the range of 0.0625 inches to 0.5 inches however, these ranges are by way of example only. The disclosed method of bending the plate into a frame could be applied to frames of any size and with varying dimensions.

Although operation 1920 describes repeatedly bending the flat plate in a corrugated manner, some embodiments could perform the bending all at once. For example, the flat plate could be bent using a metal or plastic press.

A first frame wall is attached to a first edge of the bent plate/frame extending parallel to the walls of the first and second channels (1925). This first frame wall can provide structure and prevent the leakage of air from the first and second channels. Similarly, a second frame wall is attached to a second edge of the bent plate/frame opposite the first edge extending parallel to the walls of the first and second channels (1930). This second frame wall can likewise provide structure and prevent the leakage of air from the first and second channels.

A first sealant is attached along a third edge of the bent plate/frame perpendicular to the first and second edges to block vertical sides of a first end of the first and second channels (1935), and a second sealant is attached along a fourth edge opposite the third edge of the bent plate/frame to block vertical sides of a second end of the first and second channels opposite the first end (1940) This sealant will prevent air from escaping from the vertical sides of the first and second channels on the first and second ends of the frame.

In some embodiments, the sealant will be a resin or an epoxy that is applied to the first and second edges of the bent plate/frame and hardened. However, alternate embodiments could employ any sealant that will provide an airtight seal along the open ends of the first and second channels. In embodiments that use a resin or epoxy as the sealant, the resin or epoxy may be contained in a metal cap.

A first panel is attached to a first side of the bent plate/frame to block a middle portion of the first channels (1945). In this way, air can only enter or leave the first channels at top or bottom portions of the first and second ends. Similarly, a second panel is attached to a second side of the bent plate/frame to block a middle portion of the second channels (1950). In this way air can only enter or leave the second channels at top or bottom portions of the first and second ends.

In many embodiments, the middle portion of the first and second trenches will be much larger than the end portions of the first and second trenches. For example, in some embodiments the width of the middle portion of the first and second trenches could be between five and twenty times the width of each of the first and second end portions of the first and second trenches. In some embodiments, the end portions could be between 0.5 and 3 inches long, while the width of the first and second panels could be between one and two feet. However, a heat recovery core could be made of any size. Alternate relationships and dimensions of the width of the middle and end portions of the first and second trenches are possible.

In various embodiments, the first and second panels can be made of any material or structure that will prevent air from escaping from the middle portions of the first and second trenches. This material could include metal, plastic, or any other suitable material.

In this way, a heat recovery core can be produced that has a plurality of first channels alternating with a plurality of second channels. Each of the first channels except any first channels at the edge of the frame share a side wall with two adjacent second channels. Likewise, each of the second channels except any second channel at the edge of the frame share a side wall with two adjacent first channels. These side walls will have impressions in them that will help maintain a minimum width of the first and second channels and will improve heat transfer between the first and second channels as described above.

Furthermore, air can only enter and leave the first and second channels at first and second ends (corresponding to the second and third edges), forcing air to pass through a long middle portion of the first and second channels where it can exchange heat with air in adjacent channels.

Method of Operating a Heat Recovery Core

FIG. 20 is a flow chart 2000 showing the operation of a heat recovery ventilator or energy recovery ventilator according to disclosed embodiments.

As shown in FIG. 20, the operation begins by drawing intake air into a plurality of parallel first channels at a first side of a heat recovery core (2005).

The intake air is then passed through the plurality of first channels in a first direction (2010).

Return air is then drawn into a plurality of parallel second channels at a second side of the heat recovery core (2015).

The return air is then passed through the plurality of second channels in a second direction opposite the first direction (2020).

Turbulence can be induced in the return air passing through the plurality of second channels (2025). This turbulence can mix the return air as it passes through the plurality of second channels, improving heat transfer between the return air and the intake air by making sure the same return air does not remain close to the side walls in the plurality of second channels.

Similarly, turbulence can be induced in the intake air passing through the plurality of first channels (2030). This turbulence can mix the intake air as it passes through the plurality of first channels, improving heat transfer between the intake air and the return air by making sure the same intake air does not remain close to the side walls in the plurality of first channels.

As noted above, in one embodiment, turbulence can be induced in the first and second channels through the use of impressions extending into or out of the first and second channels.

The passage of the return air through the second channels can also be slowed (2035). This slowing of the passage of the return air through the second channels can improve heat transfer between the return air and the intake air by providing additional time for the return air to exchange heat with the intake air.

Similarly, passage of the intake air through the first channels can also be slowed (2040). This slowing of the passage of the intake air through the first channels can improve heat transfer between the intake air and the return air by providing additional time for the intake air to exchange heat with the return air.

As noted above, in one embodiment, the passage of return air and intake air can be slowed in the first and second channels through the use of impressions extending into or out of the first and second channels.

As the return air passes through the second channels and the intake air passes through the first channels, the return air and the intake air exchange heat with each other (2045). In this way the warmer of the intake air and return air will provide heat to the colder of the intake air and return air.

As the intake air finishes exchanging heat with the return air, it is expelled from the first channels at a second side of the heat recovery core as supply air (2050).

Similarly, as the return air finishes exchanging heat with the intake air, it is expelled from the second channels at a first side of the heat recovery core as exhaust air (2055).

In this way, heat can be exchanged between the return air and the intake air, allowing the supply air generated by the heat recovery core to be very close to the temperature of the return air. In this way, conditioned return air in an indoor space can be replaced with supply air from an outdoor environment without the loss of a great deal of energy to condition the supply air. Since the supply air is heated or cooled to a temperature close to that of the return air, and HVAC system operating on the supply air will not have to expend a great deal of energy to bring the supply air to a desired temperature for the indoor space.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed:

1. An air-to-air heat recovery core, comprising:
   a core assembly having a plurality of first channels and a plurality of second channels defined by a plurality of parallel walls, in which
     the plurality of first channels and the plurality of second channels are all parallel,
     the plurality of first channels are open to a first side of the core assembly,
     the plurality of second channels are open to a second side of the core assembly opposite the first side of the core assembly,
     the plurality of first channels are interleaved with the plurality of second channels such that each of the plurality of first channels is adjacent to at least one of the plurality of second channels, each of the plurality of second channels is adjacent to at least one of the plurality of first channels, none of the plurality of first channels is adjacent to another one of the plurality of first channels, and none of the plurality of second channels is adjacent to another one of the plurality of second channels, and
     each of the plurality of first channels shares a wall with an adjacent one of the plurality of second channels;
   a first sealant formed along a first edge of the core assembly perpendicular to a running direction of the plurality of first channels and the plurality of second channels, the first sealant configured to block first ends of the plurality of first and second channels;
   a second sealant formed along a second edge of the core assembly perpendicular to the running direction of the plurality of first channels and the plurality of second channels and opposite the first edge of the core assembly, the second sealant configured to block second ends of the plurality of first and second channels;
   a first panel secured to the first side of the core assembly, the first panel configured to block a middle portion of each of the plurality of first channels, the middle portion of each of the plurality of first channels being located between first and second end portions of each of the plurality of first channels, such that air can enter and leave each of the plurality of first channels via the first and second end portions of the plurality of first channels but cannot enter and leave each of the plurality of first channels via the middle portions of each of the plurality of first channels; and
   a second panel secured to the second side of the core assembly, the second panel configured to block a middle portion of each of the plurality of second channels, the middle portion of each of the plurality of second channels being located between first and second end portions of each of the plurality of second channels, such that air can enter and leave each of the plurality of second channels via the first and second end portions of the plurality of second channels but cannot enter and leave each of the plurality of second channels via the middle portions of each of the plurality of second channels
wherein
at least one wall in each of the first and second channels has an impression formed in it, the impression extending away from the at least one wall in one direction,
a distance that the impression extends from the at least one wall is approximately equal to a width of a selected one of the first and second channels that the impression extends into,
a first set of walls in the first and second channels has a pattern of first impressions extending away from the first set of walls in an extending direction,
a second set of walls in the first and second channels has a pattern of second impressions extending away from the second set of walls in the extending direction,
the first set of walls are arranged in an alternating pattern with the second set of walls,
the pattern of first impressions is different from the second pattern of impressions,
the pattern of first impressions is one or more first zig-zagged trenches formed in a first arrangement,
the pattern of second impressions is one or more second zig-zagging trenches formed in a second arrangement different from the first arrangement,
the first zig-zagged trenches are each formed as a single trench in a single one of the first set of walls, and
the second zig-zagged trenches are each formed as a single trench in a single one of the second set of walls.

2. The air-to-air heat recovery core of claim 1, wherein the plurality of first channels and the plurality of second channels all have substantially the same width.

3. The air-to-air heat recovery core of claim 1, further comprising:
a first frame wall attached to a third edge of the core assembly perpendicular to the first and second edges of the core assembly; and
a second frame wall attached to a fourth edge of the core assembly perpendicular to the first and second edges of the core assembly and opposite the third edge of the core assembly.

4. The air-to-air heat recovery core of claim 1, wherein the pattern of first impressions is a plurality of first individual impressions in the first set of walls, the pattern of second impressions is a plurality of second individual impressions in the second set of walls, and none of the plurality of first impressions is formed to be opposite one of the plurality of second impressions within any of the plurality of first and second channels.

5. An energy recovery ventilator, comprising:
the air-to air heat recovery core of claim 1;
a first blower formed adjacent to the first end portions of the plurality of first channels and configured to blow exhaust air through the plurality of first channels in a first direction; and
a second blower formed adjacent to the second end portions of the plurality of second channels and configured to blow supply air through the plurality of second channels in a second direction opposite the first direction.

6. The energy recovery ventilator of claim 5, further comprising:

a first filter formed adjacent to the second end portions of the plurality of first channels and configured to filter the exhaust air that passed through the plurality of first channels, and
a second filter formed adjacent to the first end portions of the plurality of second channels and configured to filter the supply air that passed through the plurality of second channels.

7. The air-to-air heat recovery core of claim 1, wherein the impression formed in the first channel in the at least one wall in each of the first and second channels and the impression formed in the second channel in the at least one wall in each of the first and second channels extend in the same direction.

8. A method of forming an air-to-air heat recovery core, comprising:
forming first and second impressions in the flat plate before repeatedly bending the flat plate;
repeatedly bending a flat plate in a corrugated manner to form a bent plate having a plurality of first channels open to a first side of the bent plate and a plurality of second channels parallel to the plurality of first channels and open to a second side of the bent plate opposite the first side of the bent plate;
attaching a first sealant along a first edge of the bent plate perpendicular to a running direction of the plurality of first channels and the plurality of second channels in order to block first ends of the plurality of first and second channels;
attaching a second sealant along a second edge of the bent plate perpendicular to a running direction of the plurality of first channels and the plurality of second channels and opposite the first edge of the bent plate in order to block second ends of the plurality of first and second channels;
securing a first panel to the first side of the bent plate to block a middle portion of each of the plurality of first channels, the middle portion of each of the plurality of first channels being located between first and second end portions of each of the plurality of first channels, such that air can enter and leave each of the plurality of first channels via the first and second end portions of the plurality of first channels but cannot enter and leave each of the plurality of first channels via the middle portions of each of the plurality of first channels; and
securing a second panel to the second side of the bent plate to block a middle portion of each of the plurality of second channels, the middle portion of each of the plurality of second channels being located between first and second end portions of each of the plurality of second channels, such that air can enter and leave each of the plurality of second channels via the first and second end portions of the plurality of second channels but cannot enter and leave each of the plurality of second channels via the middle portions of each of the plurality of second channels; and
forming a plurality of first impressions and a plurality of second impressions in the flat plate before repeatedly bending the flat plate,
wherein
the first impression is arranged such that it is formed in a first wall in the first channel after repeatedly bending the flat plate in the corrugated manner such that it extends away from the first wall in a first direction,
the second impression is arranged such that it is formed in a second wall in the second channel after repeatedly bending the flat plate in the corrugated manner such that it extends away from the second wall in a second direction, a first distance that the first impression extends from the first wall is approximately equal to a first width of the first channel, a second distance that the second impression extends from the second wall is approximately equal to a second width of the second channel, the plurality of first impressions contains a plurality of first impression patterns each arranged in a first configuration that can be contained in a portion of the flat plate that will become a wall in one of the plurality of first and second channels, the plurality of second impressions contains a plurality of second impression patterns each arranged in a second configuration that can be contained in the portion of the flat plate that will become the wall in one of the plurality of first and second channels, the plurality of first and second impression patterns are arranged such that each of the plurality of first and second impression patterns is formed on a different portion of the flat plate that will become a wall in one of the plurality of first and second channels, the plurality of first impression patterns are interleaved with the plurality of second impression patterns such that none of the plurality of first impression patterns is adjacent to another of the plurality of first impression patterns and none of the plurality of second impression patterns is adjacent to another of the plurality of second impression patterns, the first configuration includes a plurality of the first impressions formed as first zig-zagged trenches in a first arrangement, the second configuration includes a plurality of the second impressions formed as first zig-zagged trenches in the first arrangement, the first zig-zagged trenches are each formed as a single trench in a portion of the flat plate that will become a single first wall in one of the plurality of first channels, and the second zig-zagged trenches are each formed as a single trench in a portion of the flat plate that will become a single second wall in one of the plurality of first channels.

9. The method of forming the air-to-air heat recovery core of claim 8, wherein
the plurality of first channels and the plurality of second channels all have substantially the same width.

10. The method of forming the air-to-air heat recovery core of claim 8, further comprising:
attaching a first frame wall to a third edge of the bent plate perpendicular to the first and second edges of the bent plate; and
a second frame wall attached to a fourth edge of the bent plate perpendicular to the first and second edges of the bent plate and opposite the third edge of the bent plate.

11. The method of forming the air-to-air heat recovery core of claim 8, wherein the first configuration includes a plurality of the first impressions formed as a plurality of first individual impressions in a first arrangement, the second configuration includes a plurality of the second impressions formed as a plurality of second individual impressions in a second arrangement different than the first arrangement, and none of the plurality of first impressions is formed to be opposite one of the plurality of second impressions within any of the plurality of first and second channels.

12. The method of forming the air-to-air heat recovery core of claim 8, wherein
the first direction and the second direction are a same direction.

13. The method of forming the air-to-air heat recovery core of claim 8,
wherein each of the first impression patterns is different from each of the second impression patterns.

14. A method of circulating air through an air-to-air heat recovery core having a plurality of parallel, interleaved first and second channels, comprising:
drawing intake air into the plurality of first channels at a first side of the air-to-air heat recovery core;
passing the intake air through the plurality of first channels in a first direction;
drawing return air into the plurality of second channels at a second side of the air-to-air heat recovery core opposite the first side of the air-to-air heat recovery core;
passing the return air through the plurality of second channels in a second direction opposite the first direction;
exchanging heat between the intake air passing through the plurality of first channels and the return air passing through the plurality of second channels to form supply air passing through the plurality of first channels and exhaust air passing through the plurality of second channels;
expelling the supply air from the plurality of first channels at the second side of the air-to-air heat recovery core; and
expelling the exhaust air from the plurality of second channels at the first side of the air-to-air heat recovery core,
wherein
each of the plurality of first channels is adjacent to at least one of the plurality of second channels and is not adjacent to any other of the plurality of first channels, and
each of the plurality of second channels is adjacent to at least one of the plurality of first channels and is not adjacent to any other of the plurality of second channels,
at least one wall in each of the first and second channels has an impression formed in it, the impression extending away from the at least one wall in one direction,
a distance that the impression extends from the at least one wall is approximately equal to a width of a selected one of the first and second channels that the impression extends into
the impression in each of the first channels is formed as a first zig-zagged trench in the at least one wall in a corresponding one of the first channels,
the impression in each of the second channels is formed as a second zig-zagged trench in the at least one wall in a corresponding one of the second channels,
the first zig-zagged trench in the at least one wall in the corresponding one of the first channels is each formed as a single trench in a portion of the flat plate that will become a single first wall in one of the plurality of first channels, and
the second zig-zagged trench in the at least one wall in the corresponding one of the second channels is each formed as a single trench in a portion of the flat plate that will become a single second wall in one of the plurality of second channels.

15. The method of circulating air through an air-to-air heat recovery core of claim 14, wherein
   each of the plurality of first channels is separated from an adjacent one of the plurality of second channels by a metal wall configured to pass heat.

16. The method of circulating air through an air-to-air heat recovery core of claim 14, further comprising:
   inducing turbulence into the intake air passing through the plurality of first channels, and
   inducing turbulence into the return air passing through the plurality of second channels.

17. The method of circulating air through an air-to-air heat recovery core of claim 14, further comprising:
   slowing the passage of the intake air through the plurality of first channels by placing first obstacles to air passage in the first channels, and
   slowing the passage of the return air through the plurality of second channels by placing second obstacles to air passage in the second channels.

18. The method of circulating air through an air-to-air heat recovery core of claim 14, wherein
   the impression formed in the first channel in the at least one wall in each of the first and second channels and the impression formed in the second channel in the at least one wall in each of the first and second channels extend in the same direction.

19. The method of circulating air through an air-to-air heat recovery core claim 14,
   wherein
   the exhaust air is warmer than the return air, and
   the intake air is warmer than the supply air.

20. The method of circulating air through an air-to-air heat recovery core claim 14,
   wherein
   the exhaust air is cooler than the return air, and
   the intake air is cooler than the supply air.

21. The method of circulating air through an air-to-air heat recovery core claim 14, further comprising:
   filtering the return air prior to drawing the return air into the plurality of first channels, and
   filtering the intake air prior to drawing the intake air into the plurality of second channels.

\* \* \* \* \*